(12) United States Patent
Doddi et al.

(10) Patent No.: US 12,314,204 B2
(45) Date of Patent: May 27, 2025

(54) SINGLE CLOCK LANE OPERATION FOR A MAIN BAND OF A DIE-TO-DIE CONNECTION

(71) Applicant: QUALCOMM Incorporated, San Diego, CA (US)

(72) Inventors: Ravindranath Doddi, Hyderabad (IN); Lekhya Pavani Godavarthi, Hyderabad (IN); Umamaheshwaran V, Salem (IN); Afreen Haider, Muzaffarpur (IN); Harinatha Reddy Ramireddy, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 295 days.

(21) Appl. No.: 18/300,137

(22) Filed: Apr. 13, 2023

(65) Prior Publication Data

US 2024/0345976 A1     Oct. 17, 2024

(51) Int. Cl.
*G06F 1/04*      (2006.01)
*G06F 11/07*     (2006.01)
*G06F 13/40*     (2006.01)
*G06F 13/42*     (2006.01)

(52) U.S. Cl.
CPC ........ *G06F 13/405* (2013.01); *G06F 11/0772* (2013.01); *G06F 13/4295* (2013.01); *G06F 1/04* (2013.01)

(58) Field of Classification Search
None
See application file for complete search history.

(56) References Cited

U.S. PATENT DOCUMENTS

| | | |
|---|---|---|
| 2018/0101502 A1 | 4/2018 | Nassif et al. |
| 2022/0237138 A1 | 7/2022 | Lanka et al. |
| 2022/0342840 A1 | 10/2022 | Das Sharma et al. |

OTHER PUBLICATIONS

Arasan: "All about MIPI C-PHY[SM] and MIPI D-PHY[SM]", Arasan Chip Systems, Inc, Dec. 28, 2021, 8 Pages, XP093179023, p. 7-p. 8.
International Search Report and Written Opinion—PCT/US2024/018847—ISA/EPO—Jul. 15, 2024.
"Universal Chiplet Interconnect Express (UCIe)", Specification Revision 1.0, Feb. 24, 2022, 6 Pages.

*Primary Examiner* — Paul Yen
(74) *Attorney, Agent, or Firm* — Loza & Loza, LLP/Qualcomm

(57) ABSTRACT

Aspects relate to single clock lane operation for a main band of a die-to-die connection. In one aspect, a single clock mode is enabled. A method includes sending a switch to single clock mode request from a module of a first die to a module partner of a second die through a sideband to request to enable a single clock mode of a main band of a die-to-die connection that connects the first die module to the second die module partner. A switch to single clock mode response is received from the module partner through the sideband to enable the single clock mode and data is communicated with the module partner through the main band in the single clock mode using a functional clock.

24 Claims, 11 Drawing Sheets

SINGLE CLOCK LANE OPERATION FOR A MAIN BAND OF A DIE-TO-DIE CONNECTION

TECHNICAL FIELD

Aspects of the present disclosure relate generally to communication through a die-to-die connection and, in particular, to operation through a main band with a single clock lane.

BACKGROUND

As integrated circuit (IC) chips grow smaller, it has become possible to package multiple chips into a single package. Each chip may be optimized for the cost, materials, fabrication process, and size that is best suited for a particular function. In such a package, a central processor may be fabricated separately from a graphics processor, a special purpose processor, a volatile memory, a non-volatile memory, an input/output controller, or other components. Different components may be packaged together to meet different needs without redesigning any of the individual components. By placing these disparate chips into a single package, the total system that includes the package may be made smaller. Similar principles apply to printed circuit board systems and subsystems. In addition, the connections between the disparate chips may be faster at less cost. In some cases, the smaller chips e.g., a memory, special purpose processor, or an interface, are referred to as chiplets, however, any chip may be referred to as a chiplet.

The Universal Chiplet Interconnect express (UCIe) specification version 1.0 (UCIe 1.0) defines physical parameters and protocols for data transfer between a chip and a chiplet or between two chiplets. The connection may be direct or through a package. The interconnect may be within a single package or across a circuit board between two different packages. UCIe 1.0 is intended to support interoperability between chiplets of different manufacturers and designers. The UCIe 1.0 interconnect includes a MainBand which is the primary data transfer connection and a SideBand which is the primary initialization and control connection. A sequence of state transitions is defined to take the interconnect from SideBand Initialization to MainBand Initialization to Link Initialization to an Active state and back to standby and reset states.

A Standard Package version of UCIe 1.0 uses a MainBand with 16 data lanes and two clock lanes. The Standard Package version is directed to a larger bump pitch connector, e.g., 100-130 micrometers and longer distances, e.g., 10-25 mm that might be found connecting two packages on a circuit board. An Advanced Package version of UCIe 1.0 uses a MainBand with 64 data lanes, two clock lanes and an extra redundant clock lane. The Advanced Package version is directed to a smaller bump pitch connector, e.g., 25-55 micrometers and shorter distances, e.g., less than 2 mm that might be found within a package. New applications for each version and new versions may be developed over time.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example, a method includes sending a switch to single clock mode request from a module of a first die to a module partner of a second die through a sideband to request to enable a single clock mode of a main band of a die-to-die connection that connects the first die module to the second die module partner. A switch to single clock mode response is received from the module partner through the sideband to enable the single clock mode and data is communicated with the module partner through the main band in the single clock mode using a functional clock.

In another example, a non-transitory computer-readable medium has instructions stored therein for causing a processor of an interconnect link to perform the operations of the method above.

In another example, an apparatus includes module of a first die configured to provide a main band of a die-to-die connection with a module partner of a second die. A configuration register is configured to store parameters of the main band. A processor of the module is configured to send a switch to single clock mode request to a module partner of a second die through the sideband to request to enable a single clock mode of the main band and to receive a switch to single clock mode response from the module partner through the sideband to enable the single clock mode. The processor is further configured to communicate data with the module partner through the main band in the single clock mode using the functional clock.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

A die-to-die connection herein can refer to a connection between any two dies, including a chip or a chiplet. A die may be considered to be any integrated circuit that is formed on and then cut, removed, or otherwise extracted from a wafer. The wafer may be silicon, glass, gallium nitride, or any other suitable material for forming integrated circuits. For the die-to-die connection, each die includes a module. As in UCIe 1.0, a module includes a die-to-die adapter processor, PHY (physical) logic, and the PHY interface. The interface includes the transmitters and receivers for each line. A die may have multiple modules that may be coupled to modules of different dies or to the same die. While examples are presented in the context of UCIe 1.0 this interface specification is not required. The die-to-die connections described herein may also be used to connect two packages across a printed circuit board.

In examples herein, the die-to-die connections offer a bidirectional main band with a high data rate by using two clock lanes. As used herein, a lane includes one line in each direction. 64 data lanes include 64 transmit data lines and 64 receive data lines. Each clock lane has a transmit clock line and a receive clock line. High data rates enabled by two or more clock lanes may consume power, and generate heat that is not necessary at all times. Instead of operating the main band intermittently, an approach is described to allow the main band to operate at a lower data rate, e.g., half the data rate with only one clock lane in use. A single clock mode may also be used in the event that one of the clock lanes fails. The described approach may be applied to a UCIe MainBand interconnect or to other main bands between dies that have multiple clock lanes. In the present description, a main band is initialized using a sideband. In addition, parameters, configuration registers, signaling, and other features may be adapted to suit the single clock mode operation.

Figure 1:
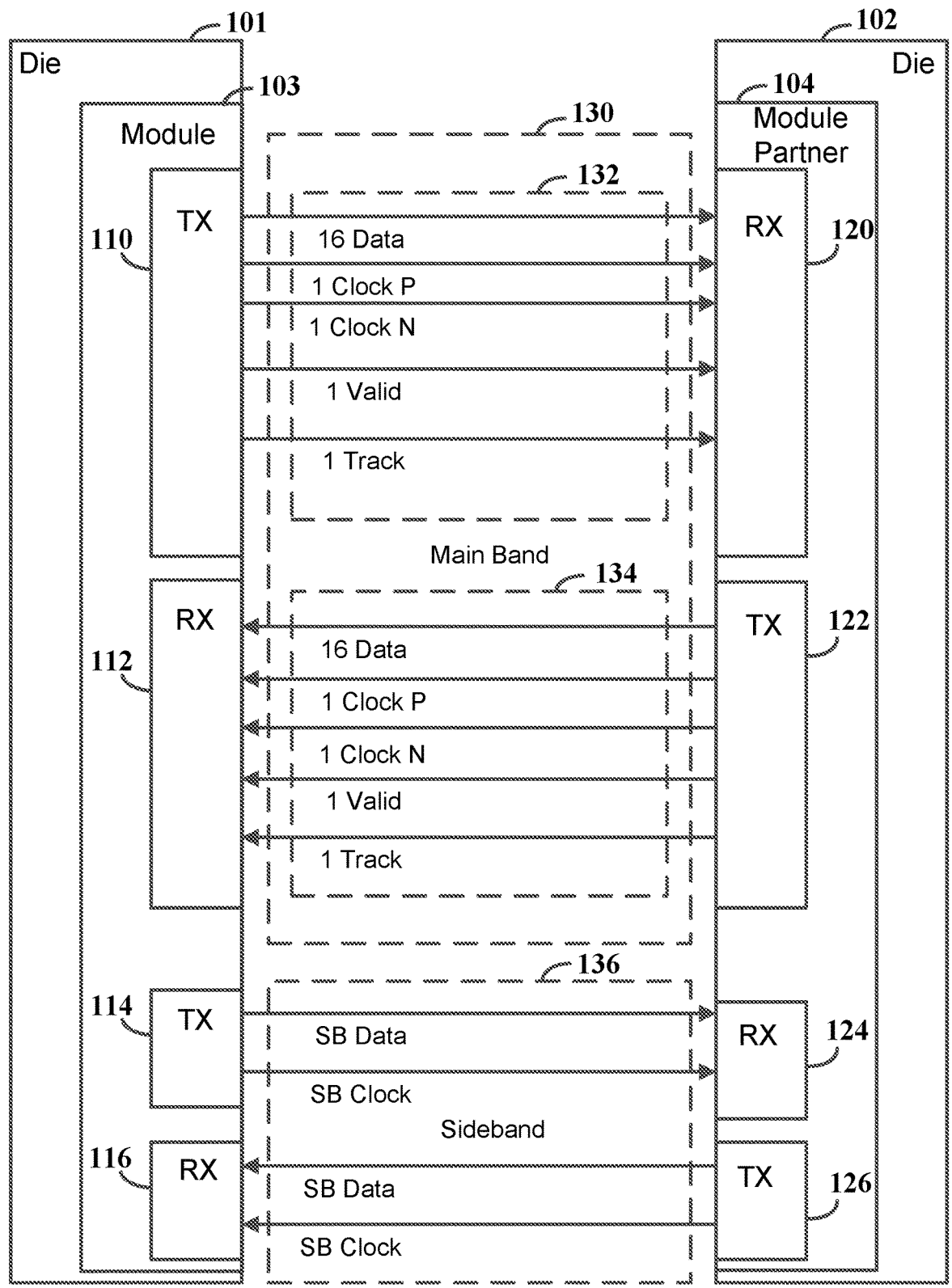
FIG. 1 is a block diagram of a module and a module partner coupled together with a die-to-die connection suitable for aspects of the present disclosure.

FIG. 1 is a block diagram of a first die 101 and a second die 102 coupled together with a connection 100, such as a die-to-die connection, e.g., a UCIe Standard package interconnect according to some aspects. Each die may have many other components (not shown) to generate, process, store, or communicate data or to supply or regulate power or perform operations, administration, or management functions, etc., depending on the nature of the die. The first die 101 has a module 103 and the second die 102 has a module partner 104. The module 103 and module partner 104 may have the same or a different structure and may include additional components (not shown) including interfaces, adapters, logic, buffers, etc. The connection 100 has a main band 130 and a sideband 136.

The main band 130 has a transmit part 132 of the module 103 and a receive part 134 of the module 103. The transmit part 132 includes a data lane with 16 transmit lines, a clock P line, a clock N line, a valid line, and a track line. The valid line is used to frame the data on the data lines. The track line can be used to perform runtime recalibration of the data lines and to repair a clock line. The module 103 has a main band receiver 112 that is connected to a receive part 134 of the main band 130. The receive part 134 includes a data lane with 16 transmit lines, a clock P line, a clock N line, a valid line, and a track line.

The sideband 136 also has a transmit part and a receive part each with a sideband data line and a sideband clock line. The connection 100 is symmetrical in that the module 103 has a main band transmitter 110 and the module partner 104 has a main band transmitter 122. These two transmitters perform the same functions and operations using the same protocols. Similarly, the module 103 has a main band receiver 112 and the module partner 104 has a main band receiver 120. The present description is directed to the module and its construction and operation but the description applies equally to the module partner 104 in just the same way. Either side may initiate repair or training and either side may initiate parameter, and configuration changes, etc. Similarly, the module 103 has a sideband transmitter 114 and a sideband receiver 116. The module partner 104 also has a sideband receiver 124 and transmitter 126.

UCIe 1.0 has a layered protocol with a physical layer and a die-to-die adapter in the module. The physical layer can consist of all types of current packaging options from different fabricators and fabrication processes. Examples include 2D packaging, 2.5D packaging, 3D packaging and other approaches e.g., silicon-bridge, embedded multi-die interconnect bridge (EMIB), interposer-based chip-on-wafer-on-substrate (CoWoS), and fan-out chip on substrate (FOCoS) interposer packages, and any other connection between two dies on the same substrate or two packages on the same substrate. Optical or electrical connections may be made between packages to other components. UCIe may be expanded in future revisions to connect dies or packages across rack-based components.

UCIe 1.0 uses a protocol layer in the module that runs on top of the physical layer, and that has many features in common with Peripheral Component Interconnect express (PCIe), Compute eXpress Link (CXL) and other pre-existing protocols. The PCIe protocol provides wide interoperability and flexibility. The CXL protocol provides low latency and high throughput connections. UCIe 1.0 may be expanded in future revisions to include other protocols and further modifications away from PCIe and CXL.

The structures and methods presented herein are described in the context of UCIe 1.0, but may be adapted to future versions of UCIe under any name and other connection configurations with multiple clock lanes. In FIG. 1, the main band 130 has two clock lanes that operate at the same frequency with different phase. There is one clock P line and one clock N line in the main band transmit part 132 and one clock P line and one clock N line in the main band receive part 134. In UCIe 1.0, this is the MainBand connection. The two lines of the transmit clock lane are referred to as TCLKP and TCLKN and the two lines of the receive clock lane are sometimes referred to as RCLKP and RCLKN. The transmit data lane has 16 data lines in the transmit part 132 and the receive data lane has 16 data lines in the receive part 134. According to UCIe 1.0, each clock lane must be functional in each direction for data traffic to be carried on the main band of the connection. According to UCIe 1.0, a failure on any one of the four clock lines renders the connection 100 unusable making the effective bandwidth of the main band 130 zero even though the data lanes are functional.

Figure 2:
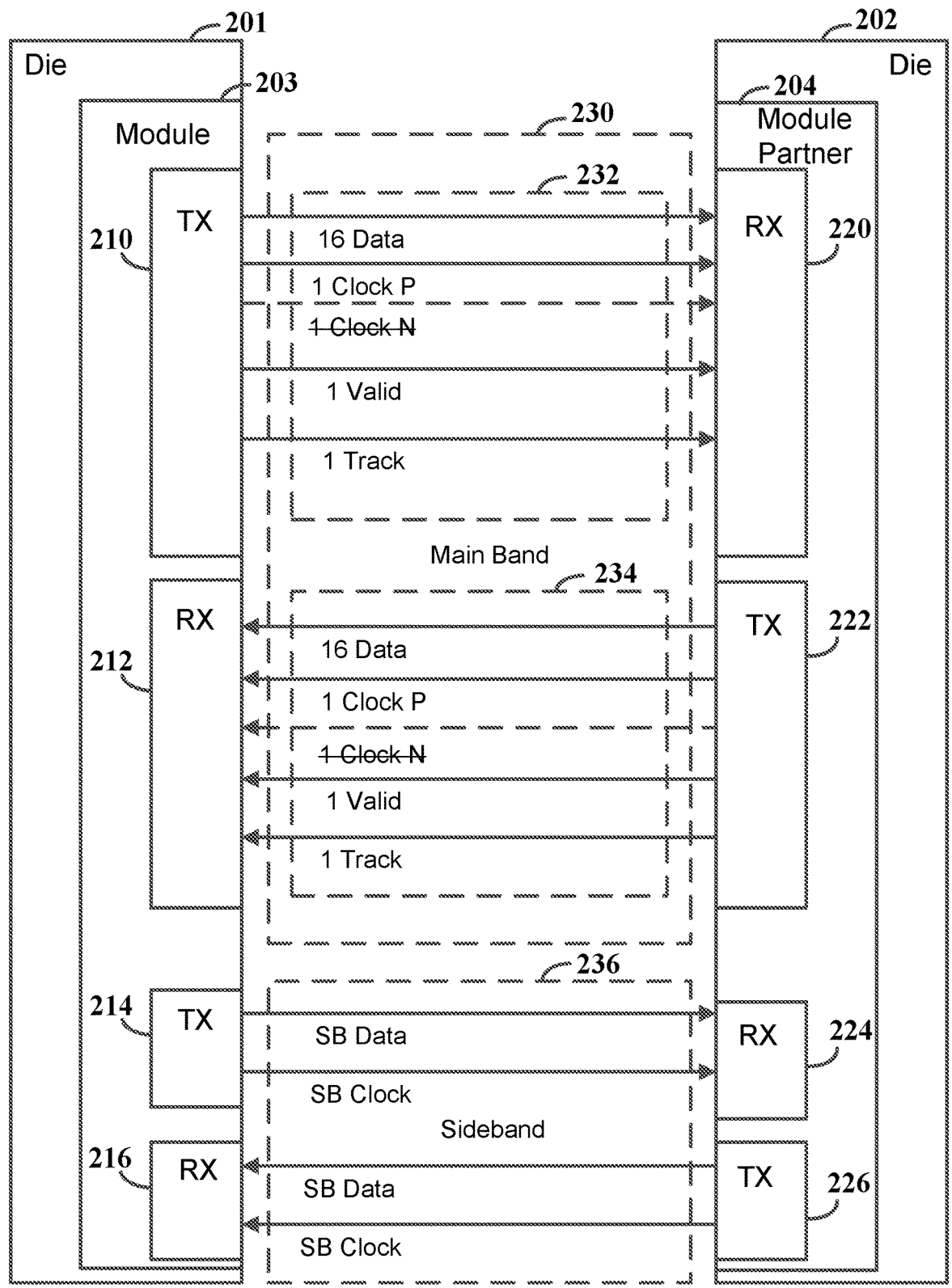
FIG. 2 is a block diagram of a module and a module partner coupled together with a die-to-die connection and a faulty clock lane in single clock mode according to aspects of the present disclosure.

FIG. 2 is a block diagram of a first die 201 and a second die 202 coupled together with a connection 200, such as a die-to-die connection 200, e.g., a UCIe 1.0 Standard package interconnect according to some aspects. In this example, the N clock line has failed or been disabled in both directions and the connection 200 is operating in a single clock mode. A module 203 of the first die 201 has a main band transmitter 210 that is connected to a transmit part 232 of a main band 230. The transmit part 232 includes a data lane with 16 transmit lines, a clock P line, a clock N line, a valid line, and a track line. The transmit part 232 is coupled to a main band receiver 220 of a module partner 204 of the second die 202. The module 203 has a main band receiver 212 that is connected to a receive part 234 of the main band 230. The receive part 234 includes a data lane with 16 transmit lines, a clock P line, a clock N line, a valid line, and a track line. The receive part 234 is coupled to a main band transmitter 222 of the module partner 204.

The module 203 also has a sideband transmitter 214 coupled through the sideband 236 of the connection 200 to a sideband receiver 224 of the module partner 204. The module 203 has a sideband receiver 216 that is coupled through the sideband 236 of the connection 200 to a sideband transmitter 226 of the module partner 204. The sideband has a sideband data line and a sideband clock line in each direction. In UCIe 1.0, the sideband has one clock lane.

As shown, the main band is operating without the N clock in the transmit part 232, sometimes referred to as TCLKN, and without the N clock in the receive part 234, sometimes referred to as RCLKN. However, using only the P clock in the transmit part 232, sometimes referred to as TCLKP, and the P clock in the receive part 234, labeled RCLKP, the main band 230 is able to operate in a single clock mode. While the single clock mode is shown as operating using only the P clock, the N clock may be used instead. The single clock mode may be used in the event of a failure of one of the clock lines or as a second mode with a lower data rate. A clock failure on either the transmit, receive, or both lines may be detected during training or it may occur during the operation of the main band. After detecting a clock failure, the module will move to a clock repair process to try to repair the clock. If this fails, then the single clock mode may be used instead. The single clock mode operates with only one clock lane so the single clock mode does not require that both clocks are functional. The single clock mode also brings lower data rates or speeds based on the one clock which can be used during thermal throttling.

Figure 3:
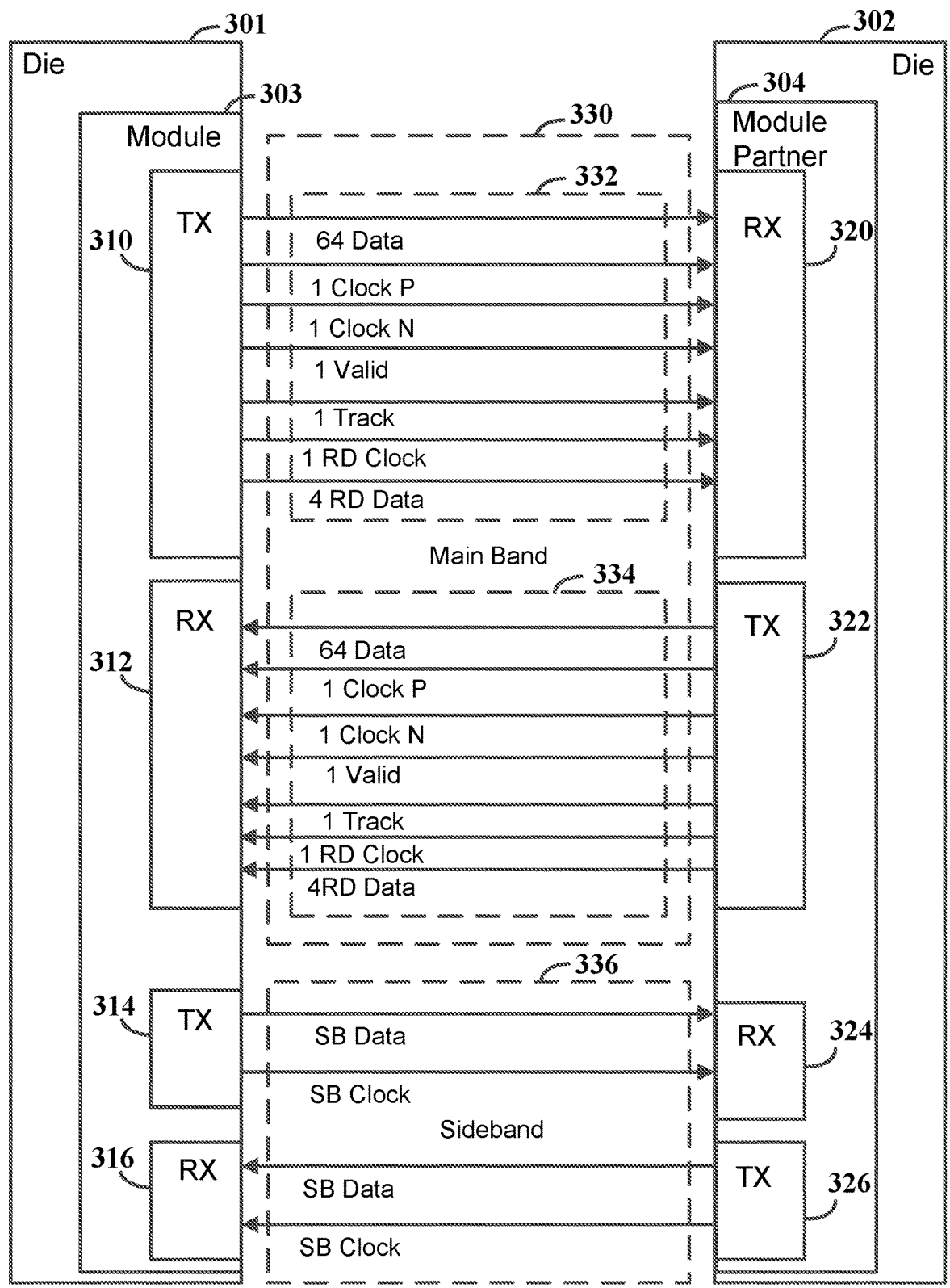
FIG. 3 is a block diagram of module and a module partner coupled together with an alternative die-to-die connection suitable for aspects of the present disclosure.

FIG. 3 is a block diagram of a first die 301 with a module 303 and second die 302 with a module partner 304 coupled together with a connection 300, e.g., a UCIe 1.0 Advanced package interconnect, according to some aspects. The module 303 has a main band transmitter 310 that is connected to a transmit part 332 of a main band 330. The transmit part 332 includes a data lane with 64 transmit lines, a clock P line, a clock N line, a valid line, and a track line. The main band transmit part 332 also includes a redundant clock line (RD Clock) and 4 redundant data lines (RD Data). The redundant lines are configured for use when one or more of the primary data or clock lines fail. The transmit part 332 is coupled to a main band receiver 320 of the module partner 304. The module 303 has a main band receiver 312 that is connected to a receive part 334 of the main band 330. The receive part 334 includes a data lane with 64 transmit lines, a clock P line, a clock N line, a valid line, a track line, a redundant clock line, and 4 redundant data lines. The receive part 334 is coupled to a main band transmitter 322 of the module partner 304.

There is one redundant clock lane provided in each direction as a repair mechanism in case of a fault on one of the clock lanes. A fault on either one of the clock lanes, P, N, will lead to configuring the redundant clock lane to replace the faulty clock lane. A fault on both of the two clock lanes in either the transmit or receive direction cannot be repaired and link training aborts. A fault on one of the clock lanes and on the redundant clock lane will result in loss of the main band 330 making the effective bandwidth zero regardless of the functional data lanes. This might occur, for example, due to an electrical short between clock lanes. In such an event, the single clock mode may be used as described below.

The module also has a sideband transmitter 314 coupled through the sideband 336 of the connection 300 to a sideband receiver 324 of the module partner 304. The sideband 336 may be the same or similar to the sideband of examples of FIGS. 1 and 2. The module 303 has a sideband receiver 316 that is coupled through the sideband 336 of the connection 300 to a sideband transmitter 326 of the module partner 304. The sideband has a sideband data lane and a sideband clock lane along with a redundant sideband data lane and sideband clock lane (not shown) in both the transmit and receive directions.

Figure 4:
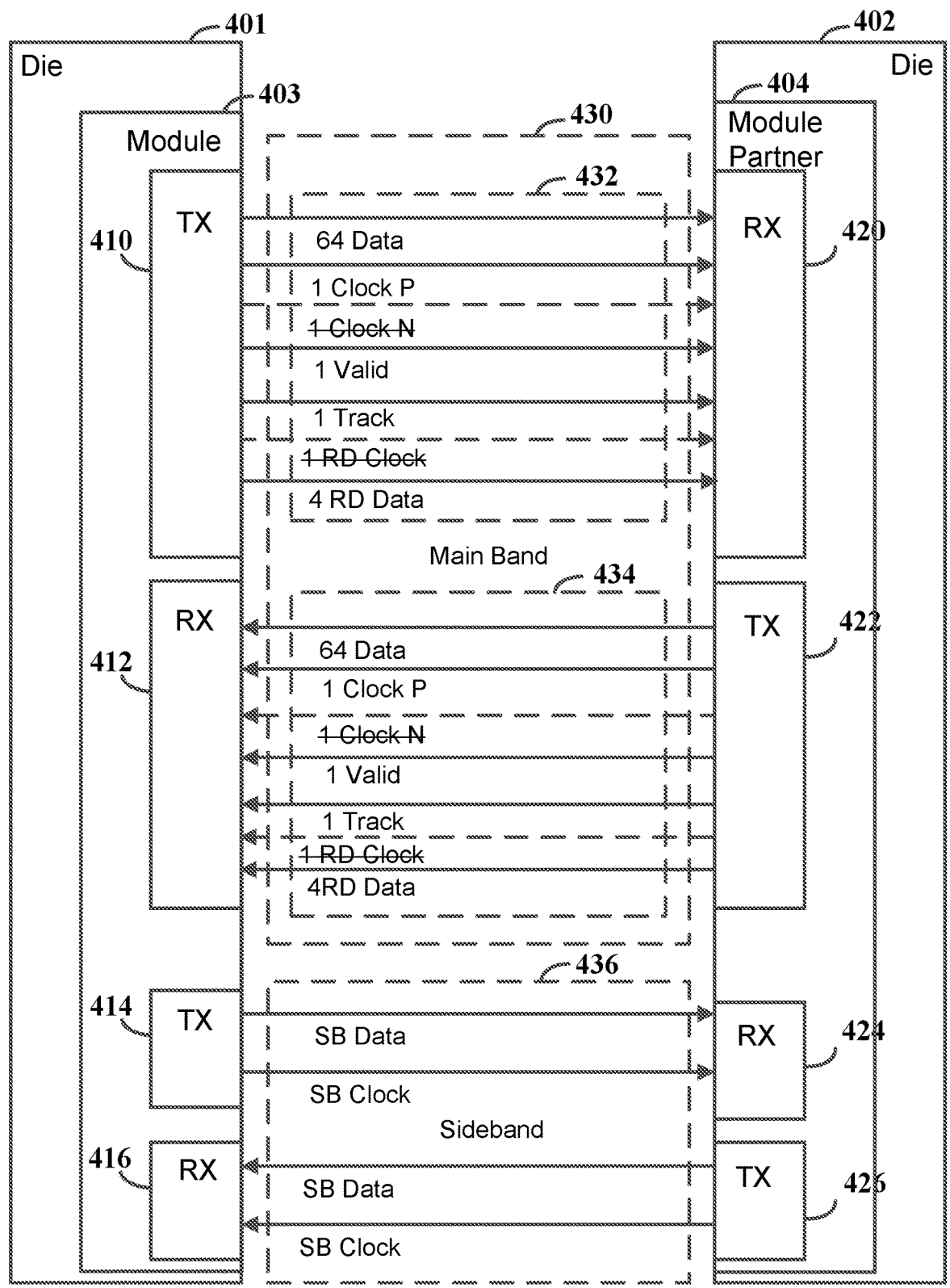
FIG. 4 is a block diagram of a module and a module partner coupled together with an alternative die-to-die connection and a faulty clock lane in a single clock mode according to aspects of the present disclosure.

FIG. 4 is a block diagram of a first die 401 with a module 403 and a second die 402 with a module partner 404 coupled together with connection 400, e.g., a UCIe 1.0 Advanced package interconnect, according to some aspects. In this example, the N clock lane and the redundant clock lane have both failed or have been disabled in both directions and the connection 400 is operating in a single clock mode. The module 403 has a main band transmitter 410 that is connected to a transmit part 432 of a main band 430. The transmit part 432 includes a data lane with 64 transmit lines, a clock P line, a clock N line, a redundant clock RD line, a valid line, a track line, and 4 redundant RD data lines. The transmit part 432 is coupled to a main band receiver 420 of the module partner 404. The module 403 has a main band receiver 412 that is connected to a receive part 434 of the main band 430. The receive part 434 includes a data lane with 64 transmit lines, a clock P line, a clock N line, a redundant clock RD line, a valid line, a track line, and 4 redundant RD data lines. The receive part 434 is coupled to a main band transmitter 422 of the module partner 404.

The module 403 also has a sideband transmitter 414 coupled through the sideband 436 of the connection 400 to a sideband receiver 424 of the module partner 404. The module 403 has a sideband receiver 416 that is coupled through the sideband 436 of the connection 400 to a sideband transmitter 426 of the module partner 404. The sideband has a sideband data line and a sideband clock line in each direction.

As shown, the main band is operating without the N clock in the transmit part 432, the redundant clock in the transmit part 432, the N clock in the receive part 434, and the redundant clock in the receive part 434. In UCIe 1.0, this would be described as the MainBand operating without TCLKN, TCLKR, RCLKN, and RCLKR which is not permitted in UCIe 1.0. However, using only the P clock in the transmit part 432 and the P clock in the receive part 434 the main band 430 is able to operate in a single clock mode. While the single clock mode is shown as operating with the P clock, alternatively, the N clock or the RD clock may be used instead. As in the standard package, the single clock mode may be used in the event of a failure of a clock lane or as a second mode with a lower data rate.

Figure 5:
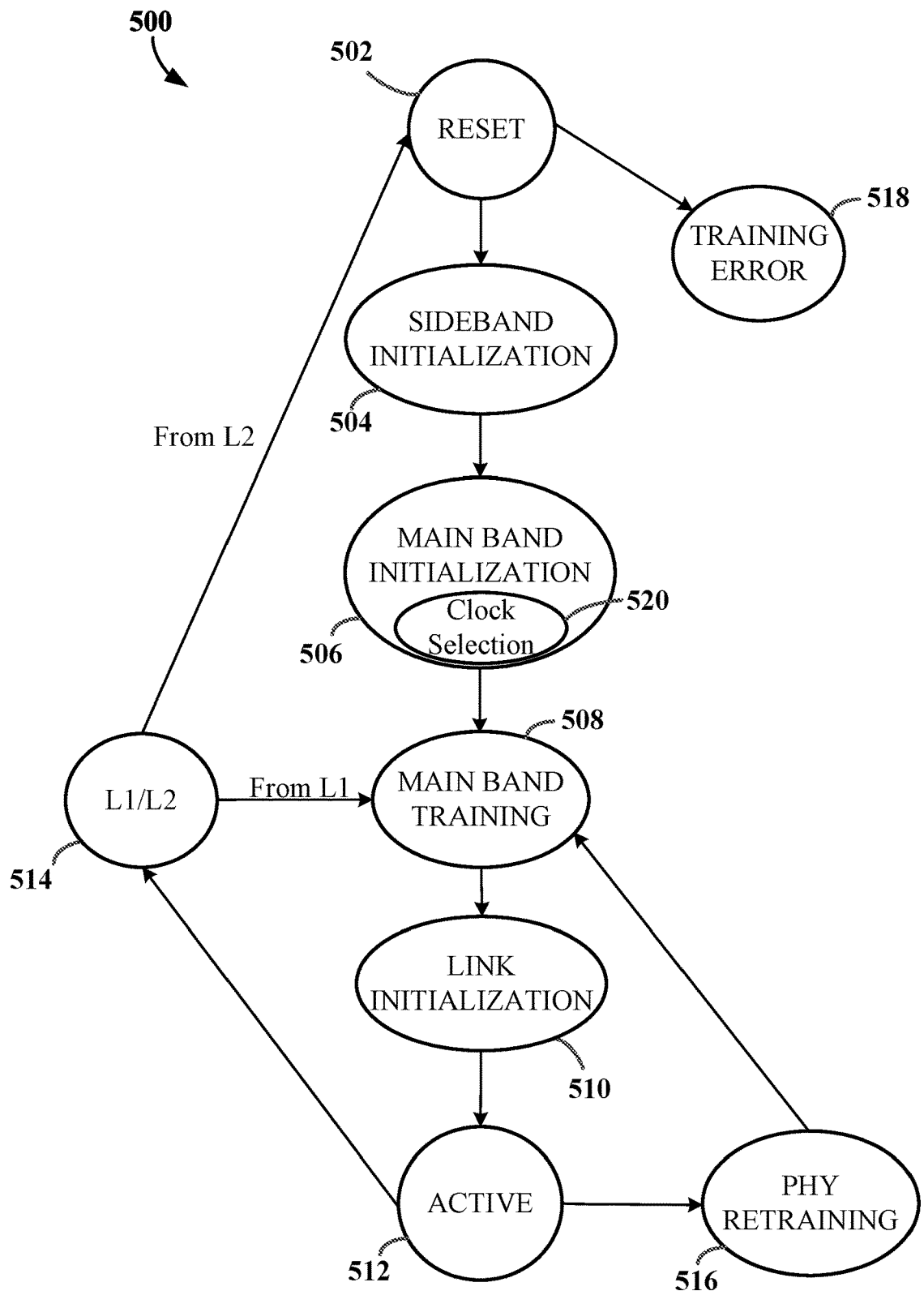
FIG. 5 is a diagram of a connection operation state machine according to aspects of the present disclosure.

FIG. 5 is a state machine diagram of a state machine 500 for operating a die-to-die connection according to some aspects. The state machine is related to a link layer form of the physical layer of a connection 200, 400 described above. The state machine may be implemented in a module or in another part of the die that controls the die-to-die connection. The same state machine may be used for UCIe Advanced mode or Standard mode or other configurations with adaptations to accommodate the differences in the lanes, as described above. The state machine 500 begins with a reset state 502 which may be obtained upon startup or upon recovery from a deep sleep or low power state, e.g., L2 state 514, or to recover from a failure. The reset state 502 may also be entered by command from higher level layers of the die, e.g., a command to switch to single clock mode.

From the reset state 502, the state machine enters a sideband initialization state 504. The sideband is a low speed, high reliability part of the connection. It is configured to be easily initialized even when there are other failures or difficult environmental conditions. After the sideband initialization state 504, the state machine may advance to a main band initialization state 506. The main band initialization state includes a clock selection sub-state 520. A single clock mode, selected in the clock selection sub-state 520, may be initialized in the main band initialization state 506 using a main band initialization (NMINIT) that invokes the single clock mode.

After the main band initialization state 506 is completed, including the clock selection sub-state 520, the state machine 500 advances from the main band initialization state 506 to a main band training state 508. In the main band training state 508, the main band data lanes are training. After the main band training state 508, the state machine 500 advances to a link initialization state 510. The link initialization state 510 refers to all of the connections between the module and the module partner. After the link initialization state 510, the state machine moves to an active state 512 for data communication between the module and the module partner. The state machine continues in the active state 512 until some event requires a transition.

One type of transition is to a PHY retraining state 516. The PHY retraining state 516 allows for the PHY layer (physical layer) of the connection to be retrained in the event of errors, or changes in circumstances or conditions on the connection. After the PHY retraining state 516, the state machine returns to the main band training state 508 and then to the link initialization state 510 and back to the active state 512 which has been recovered from the PHY retraining state 516.

Another type of transition is to an L1/L2 state 514. The L1/L2 state 514 includes two different low power or standby conditions to accommodate inactivity on the die-to-die connection. In order to reduce power consumption, heat generation, and/or wear on the dies or the connection components, the state machine 500 can transition to an L1 standby which disables many of the components of the connection especially across the main band part. From the L1 standby of the L1/L2 state 514, the state machine 500 transitions to the main band training state 508. From the main band training state 508, the state machine transitions to the link initialization state 510 and back to the active state 512. The L2 standby is a deeper standby with more components, including clocks, shut down to save more power. From L2 standby, the state machine 500 transitions from the L1/L2 state 514 back to the reset state 502. From the reset state 502, the full process of state machine transitions is performed to reach the active state 512. There may be more or fewer standby or low power states than L1 standby and L2 standby to suit different implementations.

One further state is a training error state 518 reached as a transition from the reset state 502. This state is a dead end and results in an inoperable connection. If the module is restarted, then the module re-enters the reset state 502 and may be able to initialize or may return to the training error state 518.

Using the state machine 500, the single clock mode is entered or exited using the clock selection sub-state 520. The clock selection sub-state 520 may be entered as a part of the main band initialization state 506. When the clock configuration of the main band part of the connection is changed, due to a higher layer command or upon detecting a clock failure, the main band is initialized for the new clock configuration in the main band initialization state 506. The main band is then trained for the new clock configuration in the main band training state 508. After the main band training state, 508, the state machine 500 transitions to the link initialization state 510 and the active state 512.

The clock selection sub-state 520 is entered from the reset state 502. In some circumstances, the die-to-die connection is starting up and the connection may be initialized through all of the states using the single clock mode selection or another clock mode selection as the state machine progresses through the main band initialization state. In some circumstances, a failure is detected on one or more clock lines, in which case, the state machine returns to the reset state 502 to determine the fault in the clock lines and to initialize the connection using one or more functional clocks. In some circumstances, a higher layer of the module or the die commands a transition to or from the single clock mode due to traffic, performance, thermal, or other conditions. The state machine 500 may transition through L2 standby at the L1/L2 state 514 back to the reset state 502.

Figure 6:
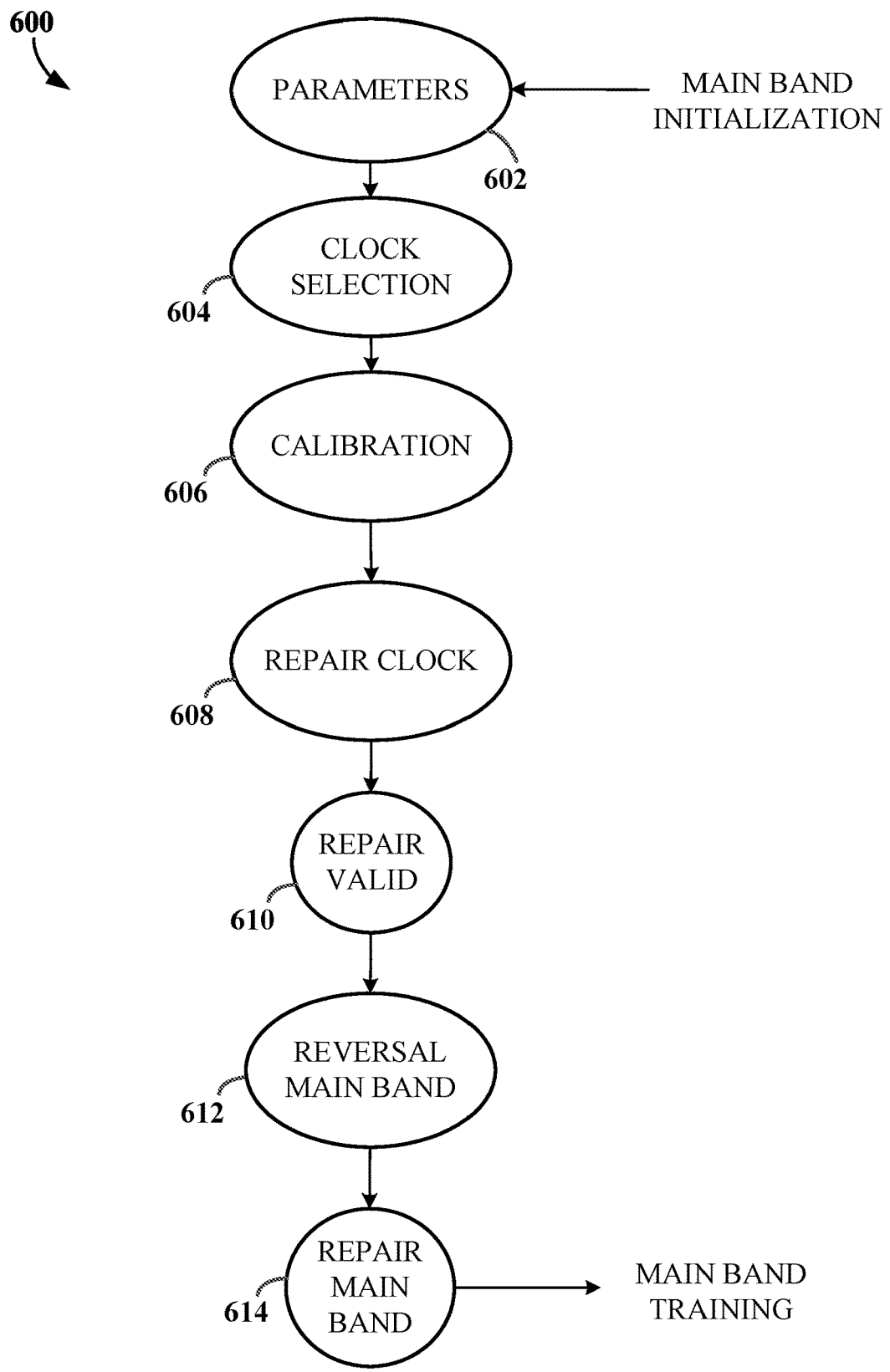
FIG. 6 is a diagram of main band initialization state machine according to aspects of the present disclosure.

FIG. 6 is a main band initialization state machine 600 which provides additional detail about the main band initialization state 506, according to some aspects. The main band initialization state machine 600 is entered by the main band initialization state to a parameters state 602 during which parameters for operation of the die-to-die connection are shared between the module and the module partner. Next, the clock selection state 604 includes selecting single or multiple clocks and selecting which clock lines, e.g., P, N and/or RD, will be used for the active state. The clock selection state 604 also includes setting parameters in configuration registers to support the selected modes. Following the clock selection state 604, a calibration state 606 is entered to calibrate the links to use the selected clock and data lanes.

The repair clock state 608 follows the calibration state 606 and allows for training patterns to be sent and received between the module and the module partner to test the clock connections between the module and the module partner through the connection. The repair clock state 608 is where a clock failure is detected and where the functional clock lines are determined.

The repair valid state 610 is used to train the valid lane which is used to frame the data on the data lines. The valid line is a type of clock signal. In UCIe 1.0, the Valid signal marks the start, and middle of a data packet on the data lines. For each 8-bit data packet with 8 unit intervals (UIs), the Valid signal is asserted for the first 4 UI and de-asserted for the second 4 UI. It is asserted again at the start of the next 8-bit packet.

The reversal main band state 612 allows for a test of the main band to determine if reversal should be applied to the data lanes of the main band. With reversal, lane 16 or lane 64 becomes lane 1 and the designation of the lanes counts through to lane 1 which becomes lane 16 or lane 64.

The repair main band state 614 is a training state of the main band data communication in which known patterns are transmitted on the data lanes to test each data lane for proper operation. This is similar to the clock repair process described in the context of FIG. 7, but for the data lanes.

After completing the operations of the main band initialization state machine 600, the link training state machine then transitions out of the main band initialization state 506 to the main band training state 508 as shown in FIG. 5.

Figure 7:
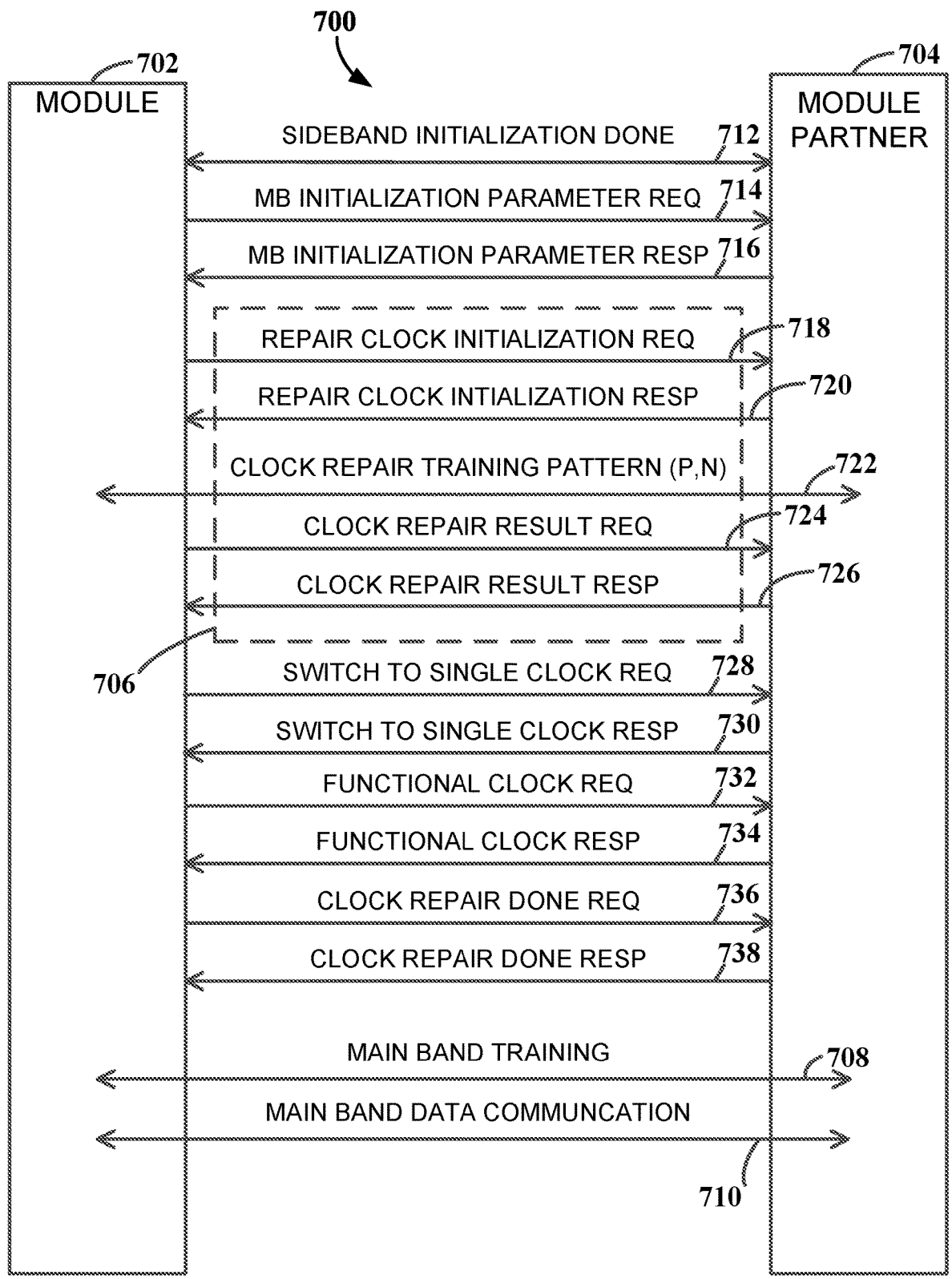
FIG. 7 is a signaling diagram of messages between a module and a module partner to switch to a single clock mode according to aspects of the present disclosure.

FIG. 7 is a signaling diagram 700 of messages between a module 702 and a module partner 704 for switching to single clock mode in the event of a clock failure, according to some aspects. The signaling begins after sideband initialization has been performed. The module and the module partner send messages of sideband initialization done 712. This corresponds to the end of the sideband initialization state 504 of FIG. 5. The shorter arrow is used to indicate that the signaling is through the sideband. The module 702 then sends a main band initialization parameter request 714 to the module partner 704. The module partner 704 replies with a main band initialization parameter response 716. These are also exchanged through the initialized sideband. The module 702 and module partner 704 perform this handshake to determine whether a "single clock mode" is supported.

UCIe 1.0 provides a more specific example for a parameter exchange. There is an exchange referred to as MBINIT.PARAM and parameters for enabling the single clock mode may be exchanged during this exchange or during a different operation. In UCIe 1.0 for both Standard package and Advanced package, the MainBand initialization request message is referred to as MBINIT.PARAM configuration req. This is a request to exchange parameters with the UCIe Module Partner. The response from the module partner is referred to as MBINIT.PARAM configuration resp and is also a sideband message. When single clock mode is used, one or more parameters may be exchanged within the same sideband messages. A first parameter is a single clock mode support parameter to indicate that the sender of the parameter supports the single clock mode. A second parameter is a single clock enable parameter to request that single clock mode be enabled. A third parameter is a functional clock parameter to indicate the clock lane to be used for the single clock mode.

In one aspect, this parameter may be referred to as the SCM Support parameter or Single Clock Mode Support parameter. The SCM Support parameter may be in the form of a one-bit value indicating that the requesting module supports SCM or does not support SCM. If the module partner also supports SCM, then it may set a parameter in a configuration register to indicate that the module supports SCM. In one aspect, the parameter is set to 1b in the module partner's response message. In some aspects, the module and module partner are pre-configured to support single clock mode and there is no SCM support handshake during the main band initialization.

An administrator, implementer, manufacturer, vendor, local or remote controller or another entity may select that the die-to-die connection is permitted to operate in single clock mode. In some aspects, this is accomplished by setting a parameter in a main band configuration register, e.g., a clock configuration register to allow single clock mode operation. The parameter may be added to a UCIe 1.0 register referred to as MainBand CLK_config_reg. Alternatively, a different configuration register may be used. During the main band parameter initialization phase, which includes the main band initialization parameter request 714 and the main band initialization parameter response 716, the module 702 and the module partner 704 handshake through the sideband to determine whether the single clock mode is supported on both the module and the module partner. If the single clock mode is supported on the module 702 and the module partner 704, then another configuration parameter may be stored in a register that identifies which clock lane will be used in the single clock mode for the transmit and for the receive direction. This corresponds to identifying a functional clock for the single clock mode. In the example of FIG. 2, P and N are available. In the example of FIG. 4, P, N, and RD are available. After this configuration, the identified clock lane is configured for subsequent link training.

After the main band initialization, the process may then continue to main band training, and link initialization, to an active state with main band data communication. However, in the example of FIG. 7, a clock fault is detected at the module 702 which causes a clock repair process 706. A repair clock initialization request 718 is sent from the module 702 to the module partner 704 using the sideband. The module partner replies with a repair clock initialization response 720. This prepares the connection for the clock repair training pattern 722. The clock repair training pattern 722 is bi-directional through the main band and follows a known pattern so that the transmitter and receiver at each end are able to detect and train to the clock signal. A longer arrow is used to indicate that the clock repair training pattern 722 is through the main band. The clock repair process 706 allows for detecting any clock failure, for repairing a detected clock failure through training the receiver on the current clock signal and clock line, and for detecting the functional clock lines.

After the clock repair training pattern 722 has been transmitted through the main band for both clocks and both directions, then the module 702 sends a clock repair result request 724 and the module partner 704 sends a clock repair result response 726. This ends the clock repair process. The module receives in the clock repair result response 726, a list of the clock faults and the functional clock lines. The module partner may then store the results of the clock repair process 706 in a configuration register. Similarly, the module partner may send a request (not shown) to the module and receive a response regarding the clock repair training pattern that is stored in the configuration register at the module partner. In another aspect, the module 702 maintains the configuration register. In some aspects the parameters are sent to the module partner from the module.

The clock repair process of UCIe 1.0, referred to as MBINIT.REPAIRCLK, is a more specific variation of the clock repair process 706 described above. In some examples, the clock repair process of UCIe 1.0 may be used in the process of FIG. 7. The clock and track lanes are checked for functional operation at the lowest data rate. The clock repair training pattern has a sequence that begins when the UCIe Module sends the SideBand message MBINIT.RE- PAIRCLK init req and waits for a response. When the UCIe Module Partner is ready to receive the clock training pattern on RCKP_L, RCKN_L, RTRK_L, then the UCIe Module Partner responds with a SideBand response MBINIT.RE-PAIRCLK init resp. After receiving the SideBand message MBINIT.REPAIRCLK init resp, the UCIe Module sends 128 iterations of the clock repair pattern (currently defined as 16 clock cycles followed by 8 cycles of low) on TCKP_L, TCKN_L, TTRK_L on the main band. The training pattern exercises both clocks P and N so that any fault may be detected on either clock.

The UCIe Module Partner detects the clock repair on RCKP_L, RCKN_L, and RTRK_L on the main band. Detection is considered successful if at least 16 consecutive cycles of the clock repair pattern are detected. The UCIe Module Partner logs the detection result for RCKP_L, RCKN_L, and RTRK_L. The module receiver and the UCIe Module Partner receiver each generate a result in response to the clock repair training pattern. The UCIe Module sends a MBINIT.REPAIRCLK result req on the SideBand and receives MBINIT.REPAIRCLK result resp SideBand response message with the logged result of the clock repair training pattern for all three main band signals, RCKP_L, RCKN_L and RTRK_L.

When, as a result of the clock repair process 706, a clock fault is detected, instead of aborting all data communication, the module may switch to single clock mode. The clock repair training pattern tests both main band clock lanes so that the module receiver and the module partner receiver each know which one, if any, of the clock lanes is functional. If the clock test applies to only one clock lane, then the training may continue to determine if another clock lane is functional. When another clock lane is functional, then the functional clock lane may be used for subsequent link training and data transfer in single clock mode with only one functional main band clock. In the case of a faulty clock lane, the module transmitter and the corresponding module partner transmitter may shut off the faulty clock lane and also tri-state the corresponding transmit lines. The transmitter is sending a clock on the functional transmit clock line and tri-stating any transmit clock line other than the functional clock transmit line. Similarly, the corresponding receivers at the module and the module partner may also be disabled for the faulty clock lanes so that any receive clock line other than the functional clock receive line is disabled. Tri-stating the lines prevents any received signal from interfering with the other clock signals. Any well-known tri-state condition may be used, e.g., a high impedance coupled to the line so that it can be pulled low or high by the external connection.

Alternatively, even if no clock fault is detected, an application may still enable the single clock mode using either one of the two functional clocks. With both clocks functional, the configured clock in the clock configuration register, CLK_config_reg, will be used for subsequent link training and data transfer. If there is only one functional clock, then that clock can be stored in a configuration register after the clock repair process. Using the functional clock req, the module communicates the selected clock with the module partner using this sideband message.

To switch to single clock mode, in some examples, the module 702 sends a switch to single clock mode request 728 to the module partner. This is sent through the sideband when the main band is still being initialized as in FIG. 7. The request to switch to single clock mode is then answered with a response, switch to single clock mode response 730, from the module partner 704. If there is no such response, and only one of the clock lanes is functional, then the main band will not function. The response from the module partner 704 may be used to indicate that the module partner 704 has enabled a single clock mode (SCM). The switch to single clock mode request 728 and the switch to single clock mode response 730 may include a single clock mode enable parameter. The single clock mode enable parameter may be stored in a configuration register at the module or at another register of the first die.

In some aspects, the functional clock or the default clock for single clock mode has already been identified. In some aspects, the functional clock may be identified as part of the switch to single clock mode request 728. In some aspects, the clock to use for single clock mode may be identified with additional sideband signaling. In the example of FIG. 7, there is a functional clock request 732 that includes the information about which clock is selected for use in single clock mode. The functional clock request 732 may include a functional clock parameter to identify a functional clock for the single clock mode. The functional clock parameter may be sent in response to receiving the clock repair result response 726 that indicates which clocks are faulty. On receiving a functional clock request 732 sideband message, the module partner 704 updates its appropriate configuration register with the identified functional clock, and then responds with a functional clock response 734 sideband message.

After successfully switching to the SCM using the selected clock lane, the process is closed with a final handshake through the sideband. The module 702 sends a clock repair done request 736 and the module partner 704 replies with a clock repair done response 738.

Upon completion of the switch to SCM, the status can then exit to a repair valid state. This is followed with main band training 708 through the main band and then main band data communication 710 through the main band in the single clock mode. At this state of the main band initialization process of FIG. 7, the main band has been switched to a lower data rate or has been rescued from an otherwise fatal clock failure, depending on the circumstances. In another aspect if, in UCIe 1.0, a Module Partner does not support SCM or if more than one clock lane fault is detected among RCKP_L, RCKN_L and RTRK_L, then the Module and Module Partner cannot operate on the MainBand connection and may exit to a training error state after performing a training error handshake on the sideband.

Table 1 is an example of a clock configuration register, referred to herein as CLK_config_reg, that may be configured to support single clock mode for a main band with only two clocks P and N, e.g., a MainBand for the Standard package. More registers may be added to accommodate more clocks and other connection configurations. In some aspects, the value in each position is set to zero by default and upon initiation. During the main band initialization, described above, a fault in either one of the two receive lines is set as "1" in the RxClk_fault position. A fault in either one of the two transmit clock lines is set as "1" in the TxClk_fault position. Either one of these faults renders the main band inoperable in a two clock mode. Rx_ClkP, Rx_ClkN, Tx_ClkP, and Tx_ClkN indicate which clocks have a fault, based on the clock repair training pattern. In addition, an SCM_support position is set to "1" to indicate that the transmitter and receiver on the main band support SCM. An SCM_enable position is set to "1" to indicate that the transmitter and the receiver have enabled and are operating in the SCM. A functional_clock position may indicate whether the N or P clock lane is identified as the functional clock in SCM.

TABLE 1

| RSVD | RxClk_fault | Rx_ClkP | Rx_ClkN |
|---|---|---|---|
| RSVD | TxClk_fault | Tx_Clk_P | Tx_ClkN |
| SCM_support | SCM_enable | functional_clock | |

When the SCM support bit is SET or "1," then the main band may be operated even if one of the clock lines has a fault as indicated in the clock configuration register. When the SCM_enable bit is SET or "1", then the main band is operating with one functional clock. The clock selection sub-state described above, allows the functional clock line to be selected for the active state. The configuration of the clock lines and the selection of the functional clock may be determined using a clock selection table in which the configuration of the active clock lanes is stored.

Table 2 is a clock selection table configured to enable determination of the selection of the active clock for a main band with two clock lanes P and N. Table 2 may be expanded to accommodate more clock lanes as appropriate. Table 1 and Table 2 are examples of information that may be stored in the configuration and parameter registers. The ClkP, ClkN and Clk_fault bits represent the configured clock for use in the Standard package context. For the Advanced package context, an additional redundant clock may be indicated. Table 2 may be used to determine if the default active state may be used under the one condition of no faults or to determine which clock is to be active for an SCM active state. The module may use the result from the table and send the result as a functional clock parameter with the functional clock request 732 from the module. In examples, the module and the module partner maintain a clock selection table, such as Table 2, and independently determine the same clock line for SCM.

TABLE 2

| Tx/Rx Clk_fault | ClkN | ClkP | Clock Selection |
|---|---|---|---|
| 0 | 1 | 1 | Both lanes are active (Default state) |
| 0 | 0 | 1 | ClkP is active for SCM |
| 0 | 1 | 0 | ClkN is active for SCM |
| 1 | 0 | 1 | ClkN is faulty, ClkP is active in SCM |
| 1 | 1 | 0 | ClkP is faulty, ClkN is active in SCM |
| 1 | 0 | 0 | Both lanes are active (TRAINING ERROR state) |

Figure 8:
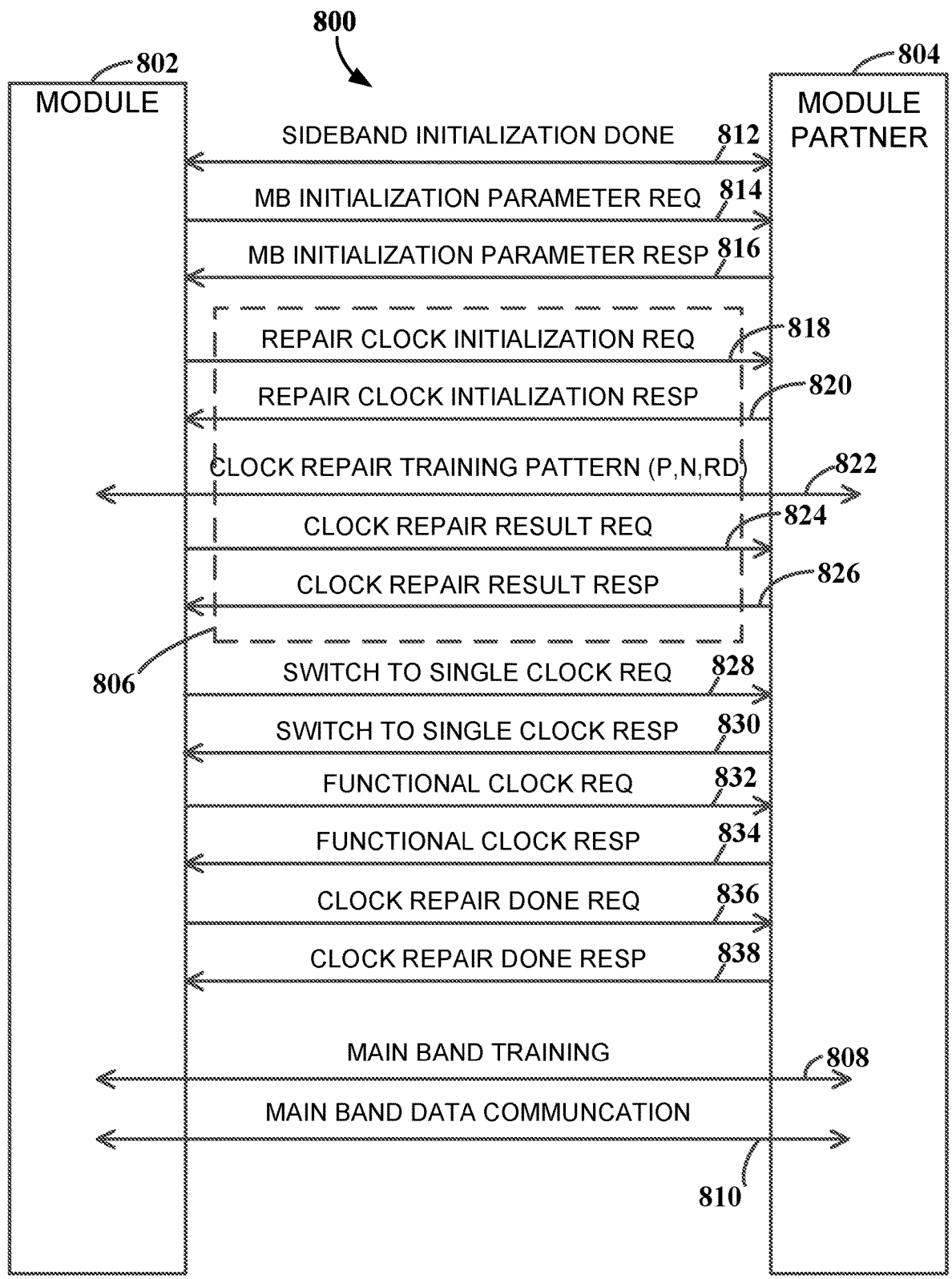
FIG. 8 is an alternative signaling diagram of messages between a module and a module partner to switch to a single clock mode according to aspects of the present disclosure.

FIG. 8 is a signaling diagram 800 of messages between a module 802 and a module partner 804 to describe a switch to single clock mode for any type of connection in which the main band has two or more clocks, e.g., an N clock, a P clock, and a redundant (RD) clock in UCIe 1.0 Advanced package. The signaling begins with sideband initialization done 812. This corresponds to the end of the sideband initialization state 504 of FIG. 5. The module 802 then sends a main band initialization parameter request 814 to the module partner. The module partner replies with a main band initialization parameter response 816. Following this handshake, the SCM-enable value for the appropriate configuration register is set or not set and the initialization proceeds to a clock repair process 806 including a clock repair training pattern 822.

After the main band initialization parameter request 814 and the main band initialization parameter response 816, the clock repair process 806 is started in response to a clock fault being detected at the module 802. In some instances, the clock repair process results in a repair using the clock repair process 806 and the module returns to main band data communication 810 using both clock lanes, or using the redundant clock lane. In the clock repair process, a repair clock initialization request 818 is sent from the module 802 to the module partner 804 using the sideband. The module partner replies with a repair clock initialization response 820. This prepares the connection for the clock repair training pattern 822. The clock repair training pattern 822 is sent through the main band and follows a known pattern so that the transmitter and receiver at each end are able to detect and train to the clock signal. The clock repair training pattern 822 on the main band includes patterns for the P, N, and RD clocks.

After the clock repair training pattern 822 has been transmitted through the main band for all of the clocks, then the module 802 sends a clock repair result request 824 and the module partner 804 sends a clock repair result response 826. This ends the clock repair process. The module partner may then store the results of the clock repair process 806 in the configuration register. A similar process may be performed in which the clock repair training pattern 822 is sent by the module partner and the module sends a clock repair result response (not shown) to the module partner. The parameter exchange may be used to populate Table 2.

The clock repair process of UCIe 1.0 for Advanced package is a more specific example of the clock repair process 806. In the UCIe 1.0 Advanced package process, each clock, track, and clock redundant physical lane (TCKP_P/RCKP_P, TCKN_P/RCKN_P, TTRK_P/RTRK_P and TCKRD_P/RCKRD_P) is independently checked to detect possible electrical opens or electrical shorts between the two clock pins. Single-ended clock receivers or an independent detection mechanism are used to determine any faults in any of the clock lanes by checking each line. The UCIe Module and UCIe Module Partner enable the transmitters and receivers on the Clock, Track and Redundant clock lanes. All the other transmitters and receivers for data are permitted to remain in tri-state.

The UCIe Module sends the SideBand message MBINIT.REPAIRCLK init req and waits for a response. The UCIe Module Partner when ready to receive the clock training patterns on RCKP_L, RCKN_L, RTRK_L, RCKRD_L responds with MBINIT.REPAIRCLK init resp. In the Advanced package context, each clock lane is trained separately. Accordingly, the UCIe Module sends 128 iterations of the clock repair training pattern (16 clock cycles followed by 8 cycles of low) on its TCKP_P only. The other clock lanes, TCKN_P, TTRK_L and TCKRD_L) are tri-stated. This clock repair training pattern is then repeated for the other lanes while the inactive lanes are tri-stated until all four lanes, TCKP_P, TCKN, TTRK_P and TCKRD_P, have been tested and trained. The UCIe Module Partner detects this pattern on RCKP_L, RCKN_L, RTRK_L and RCKRD_L, respectively. Detection is successful if at least 16 consecutive iterations of the clock repair pattern are detected. The UCIe Module Partner logs the detection result for RCKP_L, RCKN_L, RTRK_L and RCKRD_L. The UCIe Module after completing pattern transmission sends MBINIT.REPAIRCLK result req as a SideBand message to get the logged result and waits for a response. The UCIe Module Partner responds with the MBINIT.REPAIRCLK result resp SideBand message with a log result for RCKP_L, RCKN_L, RTRK_L and RCKRD_L.

For each clock repair training pattern, the training pattern should be successfully detected only on the corresponding receive line and not any other receive lines. For example, if detection is successful at the same time on any two or more of RCKP_L, RCKN_L, RTRK_L and RRDCK_L, then an electrical short is implied. If detection is not successful on any of RCKP_L, RCKN_L, RTRK_L and RRDCK_L, then repair is needed on the physical Lane TCKP_P/RCKP_P.

When a fault is detected on only one lane (CKP or CKN or TRK), then in the UCIe Advanced package, the UCIe Module is able to apply a repair on its clock or track transmitter using the redundant clock lane, RD. The UCIe Module sends a SideBand message MBINIT.REPAIRCLK apply repair req with the repair information. This information indicates which faulty clock lane is to be replaced with the redundant clock lane. The UCIe Module Partner applies the repair on the faulty lane (CKP or CKN or TRK) and sends a SideBand message MBINIT.REPAIRCLK apply repair resp confirming the repair.

When a fault is detected on more than one lane (CKP, CKN, and TRK), then the MainBand connection can no longer operate at full speed with two clocks. Stated another way, if the MainBand clock/track lanes are unrepairable because repair is needed on two of the RCKP_L, RCKN_L and RRDCK_L lanes or an electrical short is detected, then the UCIe interconnect cannot be repaired for a default operation in a two clock mode. Without SCM, the UCIe Module and UCIe Module partner must exit to the training error state after performing a training error handshake.

Any one functional clock lane may be used to operate main band data communication 810 in single clock mode. If at least one of the clock lanes, the P, N, or redundant (RD) lanes are not faulty, then the module 802 may enable a single clock mode (SCM) by sending a message: a switch to single clock request 828, through the sideband. The switch to single clock request 828 may include an SCM enable parameter that is stored in a configuration register. The module partner enables the SCM on its receiver and its transmitter and responds with an acknowledgment message through the sideband, shown as a switch to single clock mode request 830. In some aspects, the switch to single clock request 828 also include an identification of the functional clock for use in single clock mode.

On receiving the response, the module 802 sends a message through the sideband to indicate the functional clock to use with the SCM using a functional clock request 832. The indicated functional clock may be any one of the functional clocks. If only one clock is functional then this request and response are not necessary. The functional clock may be selected using the information as indicated in the clock selection table, Table 2. As an example, if CLKP is faulty, then CLKN is selected and vice versa. The module partner 804 selects and updates the clock lane in its own configuration register, e.g., the CLK_config_reg, Table 1, based on the functional clock request 832 sideband message and sends a functional clock response 834 message through the sideband. Then the module sends a sideband message of clock repair done 836 and the module partner responds with a sideband clock repair done response 838. In response to the clock repair done response 838, the module may then exit to the repair valid state 610 as shown in the state diagram of FIG. 6. The initialization further continues with main band training 808 signaling in the main band training state 508 of FIG. 5 and then to main band data communication 810 in an active state 512 as shown in the state diagram of FIG. 5 to operate the main band in single clock mode. The module transmitter can be tri-stated and turned off for the faulty clock lanes and the module partner may disable the receiver for the faulty clock lane. A similar approach may be used for the module partner transmitter and the module receiver.

If the main band clock/track lanes are unrepairable even using SCM because there is no available single clock/track lane that is not faulty, then the die-to-die connection has failed. Repair is needed on more than two of RCKP_L, RCKN_L and RRDCK_L lanes. The UCIe Module and UCIe Module partner exit to a training error state after performing a training error handshake.

Figure 9:
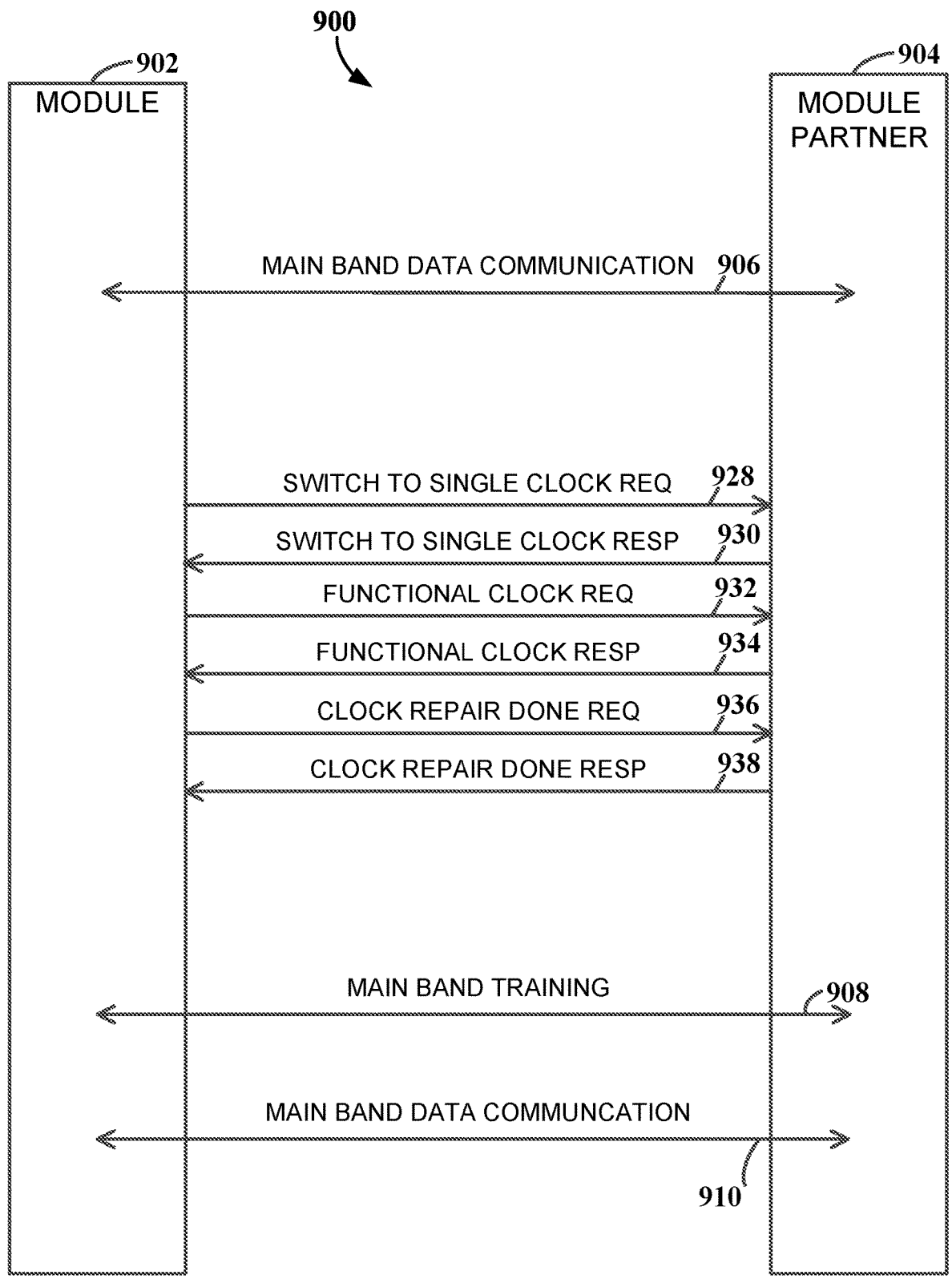
FIG. 9 is a further alternative signaling diagram of messages between a module and a module partner to switch to a single clock mode according to aspects of the present disclosure.

FIG. 9 is a signaling diagram 900 of messages between a module 902 and a module partner 904 for switching to single clock mode with no clock failure. This may be done to reduce power, reduce the data rate, or for other benefits. The signaling begins after sideband initialization has been performed. The module and the module partner have already initialized the main band data communication 906. In this example, the module 902 and module partner 904 have already performed a parameter handshake to determine whether SCM is supported.

A local or remote controller or another entity determines that the die-to-die connection should switch to single clock mode. In response to this determination or command, the module 902 sends a switch to single clock mode request 928 to the module partner. This is a request to enable SCM. This is sent through the sideband when the main band data communication 906 is still active. The request to switch to single clock mode is then answered with a switch to single clock response 930, from the module partner 904. SCM is now enabled. If there is no such response, then the main band data communication 906 may continue.

The functional clock or the default clock for single clock mode is optionally identified with a functional clock request 932 from the module 902 and a functional clock response 934 from the module partner. In some aspects, the functional clock has already been identified in an earlier exchange or has been identified in the switch to single clock mode request 928. The module 902 and the module partner 904 update the appropriate configuration register, and the process is closed with a clock repair done request 936 from the module to the module partner and a clock repair done response 938 from the module partner 904 to the module 902. In some examples, the functional clock request 932 and the functional clock response 934 are sent before or during the main band data communication 906. In some examples, there is no functional clock request 932 or functional clock response 934 because a functional clock parameter has already been provided by the module 902. The earlier provided functional clock parameter may be used to determine the functional clock for SCM. The process continues with optional main band training 908 using the new SCM and then main band data communication 910 in SCM. In some examples, the main band training has been originally performed for the main band data communication 906 and there is no need to repeat the main band training 908 so this operation is not performed.

Figure 10:
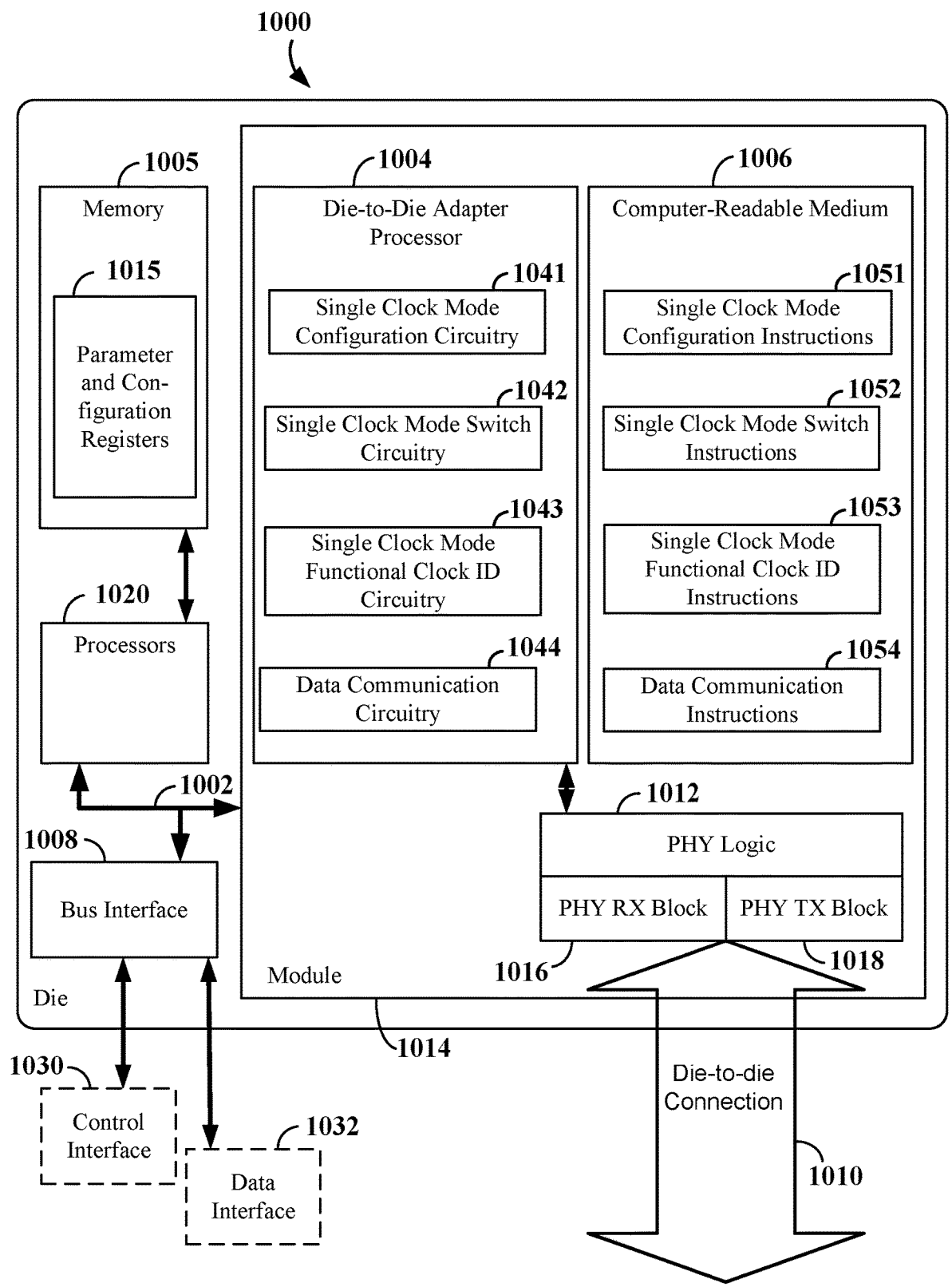
FIG. 10 is a block diagram of a die with a module for a die-to-die connection according to aspects of the present disclosure.

FIG. 10 is a block diagram of an example of a hardware implementation for a die 1000, e.g., a central processor, a graphics processor, a special purpose processor, a volatile memory, a non-volatile memory, an input/output controller, or any other suitable component with a die-to-die connection 1010. In this example, the die has processors 1020 for performing the primary operations of the die and a memory 1005. The die has a module 1014 to support a die-to-die connection 1010 with a die-to-die adapter processor 1004, a computer-readable medium 1006, PHY logic 1012, a PHY receive block 1016 and a PHY transmit block 1018. The die-to-die adapter processor 1004 performs the operations described above to service the die-to-die connection 1010 between the die 1000 and one or more other dies (not shown).

In accordance with various aspects of the disclosure, an element, or any portion of an element, or any combination of elements may be implemented with the module 1014. Examples of the module 1014 include microprocessors, microcontrollers, digital signal processors (DSPs), field programmable gate arrays (FPGAs), programmable logic devices (PLDs), state machines, gated logic, discrete hardware circuits, and other suitable hardware configured to control the die-to-die connection 1010 and the clocking modes as described throughout this disclosure. In various examples, the die 1000 may be configured to perform any one or more of the functions described herein. The die contains other components (not shown) configured to perform other functions of the die as is suitable for the type of die.

In this example, the die 1000 may be implemented with a bus architecture, represented generally by the bus 1002. The bus 1002 may include any number of interconnecting buses and bridges depending on the specific application of the module 1014, the die 1000 and the overall design constraints. The bus 1002 communicatively couples together various circuits including processors 1020, the die-to-die adapter processor 1004, the memory 1005, and the computer-readable media (represented generally by the computer-readable medium 1006) having instructions stored thereon. The bus 1002 may also link various other circuits such as timing sources, peripherals, data buffers, modules, power management circuits, and other processing cores, which are not described any further. A bus interface 1008 provides an interface between the bus 1002 and other optional external interfaces e.g., a control interface 1030 and a data interface 1032, etc. The processors 1020 are a higher layer with respect to the die-to-die adapter processor 1004 and coupled to the die-to-die adapter processor through the bus 1002. The processors 1020 may communicate operations, administration, or management control with the die-to-die adapter processor 1004 or the die-to-die adapter processor 1004 may operate autonomously. In some examples, the die-to-die adapter receives a request to reduce a data rate of the main band from a higher layer, e.g., the processors 1020/

The control interface 1030 may be used to provide a communication interface or means of communicating with various other apparatuses and devices (for example, other devices housed within the same package or system) over an internal bus or external transmission medium, such as command and control interface for power regulation, power-on test, and other purposes. The data interface 1032 may be used to provide data connections other than the die-to-die connection 1010 to other types of components within the package or system. The control interface 1030 and the data interface 1032 may be connected to a higher layer to receive reset and configuration commands that may cause the die-to-die processor to switch to a single clock mode.

The module 1014 includes a PHY receive block 1016 that corresponds to the sideband and main band receivers described above and a PHY transmit block 1018 that corresponds to the sideband and main band transmitters described above. The PHY transmit block 1016 and the PHY receive block 1018 are coupled to the die-to-die connection 1010 that corresponds to the physical part of the sideband 136 and main band 130 lanes described above that couple the first die 101 and the second die 102 through pins on respective die connectors. The module also includes PHY logic 1012 which may include the link logic to control the data applied to each line and the state machines described above under the control of the die-to-die adapter processor. The PHY logic 1012 may also include clock generators coupled to clock sources to generate the sideband and main band clock signals as described above.

The die-to-die adapter processor 1004 is responsible for managing the PHY logic 1012 and for interface processing, including the execution of software stored on the computer-readable medium 1006. The software, when executed by the die-to-die adapter processor 1004, causes the module 1014 to perform the various functions described below for any particular apparatus. The computer-readable medium 1006 and the memory 1005 may also be used for storing data that is manipulated by the die-to-die adapter processor 1004 when executing software.

The die-to-die adapter processor 1004 may be a part of the processors 1020 or of one or more other processor cores of the die 1000 (not shown) and perform operations by means of a processor core executing software stored in the computer-readable medium 1006, or the die-to-die adapter processor 1004 may be independent of any other processing resources of the die 1000 to execute software stored on the computer-readable medium 1006 using its own processing resources. Software shall be construed broadly to mean instructions, instruction sets, code, code segments, program code, programs, subprograms, software dies, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. The die-to-die adapter processor 1004 controls the operations performed by state machines, e.g., those of FIGS. 5 and 6 and causes the signaling of the signaling diagrams 700, 800, 900 and causes the clock repair training patterns to be transmitted and received.

The computer-readable medium 1006 may be a non-transitory computer-readable medium. A non-transitory computer-readable medium includes, by way of example, a magnetic storage device, a flash memory device, a random access memory (RAM), a read only memory (ROM), a programmable ROM (PROM), an erasable PROM (EPROM), an electrically erasable PROM (EEPROM), a register, and any other suitable medium for storing software and/or instructions that may be accessed and read by a controller. The computer-readable medium 1006 may reside in the module 1014 or another part of the die 1000. The computer-readable medium 1006 may be embodied in a firmware for the operation of a state machine or parameters of an ASIC. Those skilled in the art will recognize how best to implement the described functionality presented throughout this disclosure depending on the particular application and the overall design constraints imposed on the overall system.

The die 1000 may be configured to perform any one or more of the operations described herein. In some aspects of the disclosure, the die-to-die adapter processor 1004, as utilized in the die 1000, may include circuitry configured for various functions.

The die-to-die adapter processor 1004 is coupled to the memory 1005 through the bus 1022. The memory 1005 includes parameter and configuration registers 1015 that may include parameters for different clock operation modes, and the status of clock and data lanes as shown in Table 1 and in Table 2. Any other parameters and configuration values may also be stored including those for the operation of the main band in PCIe or CXL operation.

The die-to-die adapter processor 1004 may include single clock mode configuration circuitry 1041 to send requests and receive responses with a die partner to enable a single clock mode and to set an enable parameter in a clock configuration register of the parameter and configuration registers 1015. The single clock mode configuration circuitry 1041 may include one or more hardware components that provide the physical structure that performs various processes related to sending requests and receiving responses with a die partner to enable a single clock mode and to set an enable parameter. The single clock mode configuration circuitry 1041 may include functionality for a means for sending and a means for receiving messages to enable a single clock mode and means for setting an enable parameter in a clock configuration register. The single clock mode configuration circuitry 1041 may further be configured to execute single clock mode configuration instructions 1051 included on the computer-readable medium 1006 to implement the single clock mode configuration described herein.

The die-to-die adapter processor 1004 may include single clock mode switch circuitry 1042 configured to send and receive single clock mode switch messages and determine when to switch to single clock mode, as discussed herein. The single clock mode switch circuitry 1042 may include functionality for a means responsive to a command or table inference from e.g., Table 2 to switch to single clock mode and to send and receive messages to switch to single clock mode. The single clock mode switch circuitry may further set parameters for operating in single clock mode in a clock configuration register. The single clock mode switch circuitry 1042 may further be configured to execute single clock mode switch instructions 1052 included on the computer-readable medium 1006 to implement one or more functions described herein.

The module 1014 die-to-die adapter processor 1004 may include single clock mode functional clock ID circuitry 1043 configured to perform operations selecting a functional clock and sending and receiving sideband messages regarding the selected functional clock for single clock mode as discussed herein. The single clock mode functional clock ID circuitry 1043 may include functionality for sending a request and receiving a response with the die partner through the sideband identifying a functional clock for the single clock mode. The single clock mode functional clock ID circuitry 1043 may include functionality for a means for selecting a functional clock and means for sending and receiving messages regarding the selected functional clock for single clock mode through the sideband. The single clock mode functional clock ID circuitry 1043 may further be configured to execute single clock mode functional clock ID instructions 1053 included on the computer-readable medium 1006 to implement one or more functions described herein.

The die-to-die adapter processor 1004 may include data communication circuitry 1044 configured to communicate data with another die through a main band of the die-to-die connection 1010 using the functional clock in the single clock mode, as discussed herein. The data communication circuitry 1044 may include functionality for a means for communicating data with another die through a main band using the functional clock in the single clock mode. The data communication circuitry 1044 may further set parameters for operating in single clock mode in a clock configuration register. The data communication circuitry 1044 may further be configured to execute data communication instructions 1054 included on the computer-readable medium 1006 to implement one or more functions described herein.

The circuit architecture described herein may be implemented on one or more ICs, chips, chiplets, dies, interposers, packages, system printed circuit boards (PCBs), etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

Figure 11:
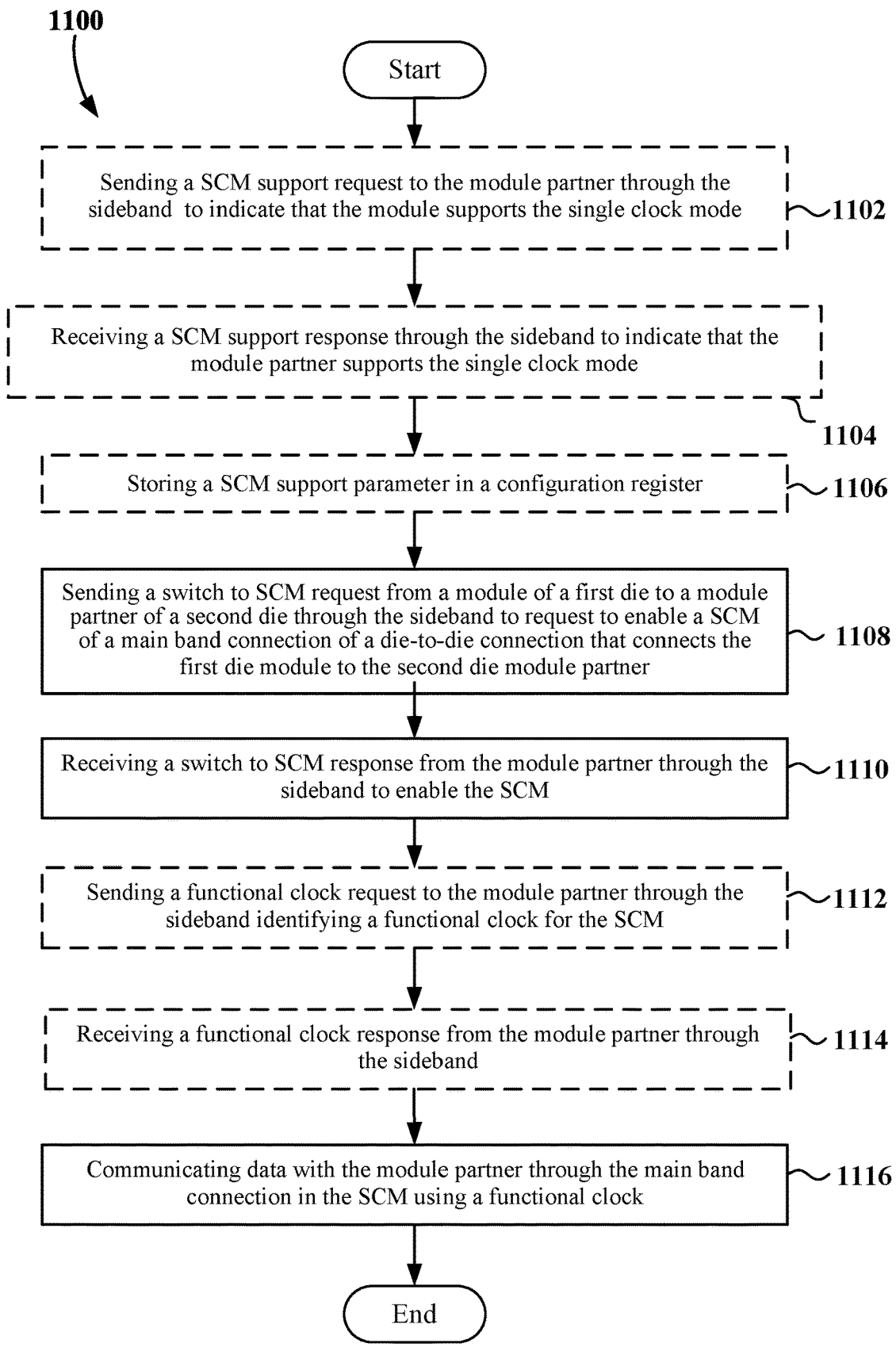
FIG. 11 is a flow diagram of aspects of operating a die-to-die connection with a single clock mode according to aspects of the present disclosure.

FIG. 11 is a process flow diagram illustrating an example of a method for using a single clock mode with a main band of a die-to-die connection such as the connections of FIGS. 1-4. The method may be performed in the die-to-die adapter processor 1004 of FIG. 10 or other circuitry, and software as described in the context of FIG. 10. The method 1100 may begin at block 1108 with sending a switch to single clock mode (SCM) request from a module of a first die to a module partner of a second die through the sideband to request to enable a single clock mode of a main band of a die-to-die connection that connects the first die module to the second die module partner.

The method may be initiated after detecting a clock failure during communicating data in a multiple clock mode. The method may be initiated after detecting a clock failure during a clock training pattern of a main band initialization. The method may be initiated in response to a request from a higher layer. The method may be initiated at main band initialization due to a configuration register status.

Responsive to the request message, the module partner may send a response. The method 1100 continues in block 1110 with receiving a switch to single clock mode response from the module partner through the sideband to enable the single clock mode. This may be performed during main band initialization or after main band data communication is already established. Some examples may include storing a single clock mode enable parameter in a configuration register in response to the receiving the switch to single clock mode response through the sideband.

In block 1112, responsive to receiving the response, sending a functional clock request to the module partner through the sideband identifying a functional clock for the single clock mode is performed. This is an optional operation. In some aspects, the functional clock has been previously identified or the functional clock is identified in the switch to SCM request of block 1108. In block 1114, the module partner may optionally send a further response so that receiving a functional clock response from the module partner through the sideband is performed. This may be performed during main band initialization or after main band data communication is already established.

After single clock mode is enabled, the functional clock is identified and the switch is made to single clock mode using the identified functional clock, main band communication may be performed. In block 1116, communicating data with the module partner through the main band in the single clock mode using the functional clock is performed. In the single clock mode, the module may be tri-stating any transmit clock line other than the functional clock and disabling any receive clock line other than the functional clock.

In some examples, the module of the first die and the module partner of the second die are configured for single clock mode support in advance of any startup or have already been configured due to an earlier initialization. In some examples, support for single clock mode is determined before single clock mode is enabled. To determine support for single clock mode in block 1102, sending a single clock mode support request to the module partner through the sideband is optionally performed to indicate that the module supports the single clock mode.

The module partner has received the request and sends a response. In block 1104, receiving a single clock mode support response through the sideband is optionally performed to indicate that the module partner supports the single clock mode. Block 1106 relates to storing a single clock mode support parameter in a configuration register. This may be performed by the module in response to the sideband single clock mode support response.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Combinations of the above should also be included within the scope of computer-readable media.

The following provides an overview of examples of the present disclosure.

Example 1: A method comprising sending a switch to single clock mode request from a module of a first die to a module partner of a second die through a sideband to request to enable a single clock mode of a main band of a die-to-die connection that connects the first die module to the second die module partner; receiving a switch to single clock mode response from the module partner through the sideband to enable the single clock mode; and communicating data with the module partner through the main band in the single clock mode using a functional clock.

Example 2: The method of example 1, wherein the sending the switch to single clock mode request is performed during a main band initialization.

Example 3: The method of examples 1 or 2, further comprising disabling any clock of the main band other than the functional clock.

Example 4: The method of example 3, further comprising tri-stating any transmit clock line other than the functional clock.

Example 5: The method of any one or more of the above examples, further comprising receiving a request to reduce a data rate of the main band from a higher layer and wherein the sending the switch to single clock mode request to the module partner is performed in response to the request to reduce the data rate.

Example 6: The method of any one or more of the above examples, wherein the communicating the data in the single clock mode comprises communicating the data in the single clock mode at half the data rate of the communicating the data with multiple clock lanes.

Example 7: The method of any one or more of the above examples, further comprising storing a single clock mode enable parameter in a configuration register in response to the receiving the switch to single clock mode response.

Example 8: The method of any one or more of the above examples, further comprising before the sending the switch to single clock mode request: sending a single clock mode support request to the module partner through the sideband to indicate that the module supports the single clock mode; and receiving a single clock mode support response through the sideband to indicate that the module partner supports the single clock mode.

Example 9: The method of example 8, further comprising storing a single clock mode support parameter in a configuration register.

Example 10: The method of any one or more of the above examples, further comprising before the sending the switch to single clock mode request: initializing a main band with the module partner using a multiple clock mode; communicating data with the module partner through the main band in the multiple clock mode; and detecting a clock failure during the communicating data in the multiple clock mode.

Example 11: The method of any one ore of the above examples further comprising: sending a functional clock request to the module partner through the sideband identifying a functional clock for the single clock mode; and receiving a functional clock response from the module partner through the sideband.

Example 12: The method of example 11, wherein the sending the functional clock request comprises sending the functional clock request during a main band initialization.

Example 13: The method of example 11, further comprising after the detecting the clock failure: sending a clock repair training pattern; receiving a clock repair result response; and determining the functional clock, wherein the sending the functional clock request is performed in response to the receiving the clock repair result response.

Example 14: The method of example 13, wherein the sending the clock repair training pattern comprises sending iterations of a clock repair pattern to the module partner on each clock line of the main band.

Example 15: A non-transitory computer-readable medium having instructions stored therein for causing a processor of a die to perform operations comprising: sending a switch to single clock mode request from a module of a first die to a module partner of a second die through a sideband to request to enable a single clock mode of a main band of a die-to-die connection that connects the first die module to the second die module partner; receiving a switch to single clock mode response from the module partner through the sideband to enable the single clock mode; and communicating data with the module partner through the main band in the single clock mode using a functional clock.

Example 16: The medium of example 15, the operations further comprising receiving a request to reduce a data rate of the main band from a higher layer and wherein the sending the sideband switch to single clock mode request to the module partner is performed in response to the request to reduce the data rate.

Example 17: The medium of example 15 or 16, wherein the communicating the data in the single clock mode comprises communicating the data in the single clock mode at half the data rate of the communicating the data with multiple clock lanes.

Example 18: The medium of any one or more of the examples 15-17, the operations further comprising before the sending the switch to single clock mode request: sending a single clock mode support request to the module partner through the sideband to indicate that the module supports the single clock mode; and receiving a single clock mode support response through the sideband to indicate that the module partner supports the single clock mode.

Example 19: The medium of any one or more of examples 15-18, the operations further comprising before the sending the switch to single clock mode request: initializing a main band with the module partner using a multiple clock mode; communicating data with the module partner through the main band in the multiple clock mode; and detecting a clock failure during the communicating data in the multiple clock mode.

Example 20: The method of example 19, the operations further comprising after the detecting the clock failure: sending a clock repair training pattern; receiving a clock repair result response; and determining the functional clock, wherein the sending the functional clock request is performed in response to the receiving the clock repair result response.

Example 21: An apparatus comprising: a module of a first die configured to provide a main band of a die-to-die connection with a module partner of a second die; a configuration register configured to store parameters of the main band; and a processor of the module configured to: send a sideband switch to single clock mode request from the module to the module partner to request to enable a single clock mode of the main band; receive a sideband switch to single clock mode response from the module partner to enable the single clock mode; send a sideband functional clock request to the module partner identifying a functional clock for the single clock mode; receive a sideband functional clock response from the module partner; and communicate data with the module partner through the main band in the single clock mode using the functional clock.

Example 22: The apparatus of example 21, wherein the processor of the module is further to disable any clock of the main band other than the functional clock.

Example 23: The apparatus of example 21 or 22, wherein the processor of the module is further to tri-state any transmit clock line other than the functional clock.

Example 24: The apparatus of any one or more of examples 21-23, wherein the processor of the module is further to store a single clock mode enable parameter in the configuration register in response to the sideband switch to single clock mode response.

Example 25: An apparatus comprising means for sending a sideband parameter configuration request to a module partner to enable a single clock mode with a main band of a die-to-die connection; means for receiving a sideband parameter configuration response from the module partner to enable the single clock mode with the main band; means for setting an enable parameter in a clock configuration register to enable the single clock mode; means for sending a sideband request to the module partner to switch to the single clock mode; means for receiving a sideband response from the module partner to switch to the single clock mode; means for sending a sideband request to the module partner identifying a functional clock for the single clock mode; means for receiving a sideband response from the module partner identifying the functional clock for the single clock mode; and means for communicating data with the module partner through the main band using the functional clock in the single clock mode.

It is to be appreciated that the present disclosure is not limited to the exemplary terms used above to describe aspects of the present disclosure. E.g., the die-to-die connection may also be referred to as an interconnect, a bus, a link, or another term.

Although aspects of the present disclosure are discussed above using the example of UCIe 1.0, it is to be appreciated that the present disclosure is not limited to this example, and may be used with other standards.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method comprising:
sending a switch to single clock mode request from a module of a first die to a module partner of a second die through a sideband to request to enable a single clock mode of a main band of a die-to-die connection that connects the first die module to the second die module partner;
receiving a switch to single clock mode response from the module partner through the sideband to enable the single clock mode; and
communicating data with the module partner through the main band in the single clock mode using a functional clock.

2. The method of claim 1, wherein the sending the switch to single clock mode request is performed during a main band initialization.

3. The method of claim 1, further comprising disabling any clock of the main band other than the functional clock.

4. The method of claim 3, further comprising tri-stating any transmit clock line other than the functional clock.

5. The method of claim 1, further comprising receiving a request to reduce a data rate of the main band from a higher layer and wherein the sending the switch to single clock mode request to the module partner is performed in response to the request to reduce the data rate.

6. The method of claim 1, wherein the communicating the data in the single clock mode comprises communicating the data in the single clock mode at a data rate that is half a data rate of the communicating the data with multiple clock lanes.

7. The method of claim 1, further comprising storing a single clock mode enable parameter in a configuration register in response to the receiving the switch to single clock mode response.

8. The method of claim 1, further comprising before the sending the switch to single clock mode request:
sending a single clock mode support request to the module partner through the sideband to indicate that the module supports the single clock mode; and
receiving a single clock mode support response through the sideband to indicate that the module partner supports the single clock mode.

9. The method of claim 8, further comprising storing a single clock mode support parameter in a configuration register.

10. The method of claim 1, further comprising before the sending the switch to single clock mode request:
initializing a main band with the module partner using a multiple clock mode;
communicating data with the module partner through the main band in the multiple clock mode; and
detecting a clock failure during the communicating data in the multiple clock mode.

11. The method of claim 1, further comprising:
sending a functional clock request to the module partner through the sideband identifying the functional clock for the single clock mode; and
receiving a functional clock response from the module partner though the sideband.

12. The method of claim 11, wherein the sending the functional clock request comprises sending the functional clock request during a main band initialization.

13. The method of claim 10, further comprising after the detecting the clock failure:
sending a clock repair training pattern;
receiving a clock repair result response; and
determining the functional clock,
wherein the sending the functional clock request is performed in response to the receiving the clock repair result response.

14. The method of claim 13, wherein the sending the clock repair training pattern comprises sending iterations of a clock repair pattern to the module partner on each clock line of the main band.

15. A non-transitory computer-readable medium having instructions stored therein for causing a processor of a die to perform operations comprising:
sending a switch to single clock mode request from a module of a first die to a module partner of a second die through a sideband to request to enable a single clock mode of a main band of a die-to-die connection that connects the first die module to the second die module partner;
receiving a switch to single clock mode response from the module partner through the sideband to enable the single clock mode; and
communicating data with the module partner through the main band in the single clock mode using a functional clock.

16. The medium of claim 15, the operations further comprising receiving a request to reduce a data rate of the main band from a higher layer and wherein the sending the switch to single clock mode request to the module partner is performed in response to the request to reduce the data rate.

17. The medium of claim 15, wherein the communicating the data in the single clock mode comprises communicating the data in the single clock mode at a data rate that is half a data rate of the communicating the data with multiple clock lanes.

18. The medium of claim 15, the operations further comprising before the sending the switch to single clock mode request:
sending a single clock mode support request to the module partner through the sideband to indicate that the module supports the single clock mode; and
receiving a single clock mode support response through the sideband to indicate that the module partner supports the single clock mode.

19. The medium of claim 15, the operations further comprising before the sending the switch to single clock mode request:
initializing a main band with the module partner using a multiple clock mode;
communicating data with the module partner through the main band in the multiple clock mode; and
detecting a clock failure during the communicating data in the multiple clock mode.

20. The medium of claim 19, the operations further comprising after the detecting the clock failure:
sending a clock repair training pattern;
receiving a clock repair result response; and
determining the functional clock, wherein the sending the functional clock request is performed in response to the receiving the clock repair result response.

21. An apparatus comprising:
a module of a first die configured to provide a main band of a die-to-die connection with a module partner of a second die;
a configuration register configured to store parameters of the main band; and
a processor of the module configured to:
send a switch to single clock mode request from the module to the module partner through the sideband to request to enable a single clock mode of the main band;
receive a switch to single clock mode response from the module partner through the sideband to enable the single clock mode; and
communicate data with the module partner through the main band in the single clock mode using a functional clock.

22. The apparatus of claim 21, wherein the processor of the module is further to disable any clock of the main band other than the functional clock.

23. The apparatus of claim 21, wherein the processor of the module is further to tri-state any transmit clock line other than the functional clock.

24. The apparatus of claim 21, wherein the processor of the module is further to store a single clock mode enable parameter in the configuration register in response to the switch to single clock mode response.

* * * * *